(12) United States Patent
Takehisa et al.

(10) Patent No.: US 12,420,400 B2
(45) Date of Patent: Sep. 23, 2025

(54) BATTERY PACK AND ELECTRICAL DEVICE

(71) Applicant: Koki Holdings Co., Ltd., Tokyo (JP)

(72) Inventors: Masashi Takehisa, Ibaraki (JP);
Tomomasa Nishikawa, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/575,278

(22) PCT Filed: Sep. 28, 2022

(86) PCT No.: PCT/JP2022/036103
§ 371 (c)(1),
(2) Date: Dec. 28, 2023

(87) PCT Pub. No.: WO2023/054444
PCT Pub. Date: Apr. 6, 2023

(65) Prior Publication Data
US 2024/0326222 A1   Oct. 3, 2024

(30) Foreign Application Priority Data
Sep. 29, 2021  (JP) .................................. 2021-158764

(51) Int. Cl.
*B25F 5/00*  (2006.01)
*B25F 5/02*  (2006.01)
*H01M 10/48* (2006.01)

(52) U.S. Cl.
CPC .............. *B25F 5/02* (2013.01); *H01M 10/48* (2013.01)

(58) Field of Classification Search
CPC .................................................... H01M 10/48
See application file for complete search history.

(56) References Cited

U.S. PATENT DOCUMENTS

| 8,852,776 | B2 * | 10/2014 | Bublitz | H01M 50/247 173/217 |
| 2011/0114345 | A1 * | 5/2011 | Schlesak | B25D 17/00 173/1 |
| 2015/0187198 | A1 * | 7/2015 | Silverberg | B25F 5/00 340/689 |

FOREIGN PATENT DOCUMENTS

| GB | 2261124 A * | 5/1993 | ............. H02J 7/008 |
| JP | 2005224909 | 8/2005 | |

(Continued)

OTHER PUBLICATIONS

"International Search Report (Form PCT/ISA/210) of PCT/JP2022/036103", mailed on Nov. 15, 2022, with English translation thereof, pp. 1-4.

(Continued)

*Primary Examiner* — Eyamindae C Jallow
(74) *Attorney, Agent, or Firm* — JCIPRNET

(57) ABSTRACT

In a battery pack and an electrical device, one or more sensors are provided at a battery pack side, and sensor information acquired on a battery side is used to control an electrical device main body. Sensors that collect and output physical information arising due to external factors are provided at a battery pack, and a control part of the battery pack processes signals detected by the sensors and creates a control signal compatible with a mounted electrical device main body. The control part of the battery pack transmits, to the electrical device main body, a signal for controlling the electrical device main body via a communication terminal to enable a control part of the electrical device main body to perform optimal control using sensor information.

12 Claims, 19 Drawing Sheets

(56) References Cited

FOREIGN PATENT DOCUMENTS

| | | | |
|---|---|---|---|
| JP | 2012148388 A * | 8/2012 | |
| JP | 2015008080 | 1/2015 | |
| JP | 2019042850 | 3/2019 | |
| JP | 2020525165 | 8/2020 | |
| JP | 2021049628 | 4/2021 | |
| WO | WO-2012133628 A1 * | 10/2012 | ............ G01D 11/24 |
| WO | 2020260079 | 12/2020 | |

OTHER PUBLICATIONS

"Office Action of Japan Counterpart Application", issued on Nov. 12, 2024, with English translation thereof, p. 1-p. 12.
"Notice of Reasons for Refusal of Japan Counterpart Application", issued on May 13, 2025, with English translation thereof, p. 1-p. 8.

* cited by examiner

Tilt by 45 degrees

Operation prohibited

Tilt by 150 degrees g: gravitational acceleration

BATTERY PACK AND ELECTRICAL DEVICE

CROSS-REFERENCE TO RELATED APPLICATION

This application is a 371 application of the International PCT application serial no. PCT/JP2022/036103, filed on Sep. 28, 2022, which claims the priority benefits of Japan Patent Application No. 2021-158764, filed on Sep. 29, 2021. The entirety of each of the above-mentioned patent applications is hereby incorporated by reference herein and made a part of this specification.

TECHNICAL FIELD

The present invention relates to a battery pack and an electrical device.

RELATED ART

Portable electrical devices powered by battery packs are widely used. Such well-known technology is disclosed, for example, in Patent Document 1. Patent Document 1 discloses an adapter that is mounted between a battery pack and an electrical device main body and includes a tilt sensor, a control part, and a signal output terminal. The adapter in Patent Document 1 is configured such that, upon detecting that a tilt detected by the tilt sensor is greater than a predetermined value, a control part of the adapter outputs a stop signal from the signal output terminal to the electrical device main body to cut off power supply from the battery pack to the electrical device main body. Since the adapter disclosed in Patent Document 1 is mounted between the battery pack and the electrical device main body, the overall size of the electrical device increases and the operability deteriorates compared to the case where the adapter is not mounted. Thus, a configuration that suppresses an increase in size of the electrical device by providing the sensor at the battery pack is described in Patent Document 2.

Patent Document 2 discloses an impact tool in which an acceleration sensor and a control part are provided at a battery pack, impacts caused by an impact tool main body are detected by the control part on the battery pack side, and the control part turns off a switching element provided on the battery pack side to cut off power supply from the battery pack to the impact tool.

RELATED ART DOCUMENTS

Patent Documents

Patent Document 1: Japanese Patent Application Laid-Open No. 2019-042850
Patent Document 2: Japanese Patent Application Laid-Open No. 2005-224909

SUMMARY OF INVENTION

Problems to be Solved by Invention

The control in Patent Document 2 cuts off power supply to the main body side within the battery pack according to the determination of the battery pack. Thus, although it is possible to detect impacts in the case of being connected to an impact tool that generates a large impact force, there is a problem that it is not possible to detect impacts in the case of being connected to an impact tool that generates a small impact force, which is considered to have low versatility. To increase versatility, it is considered useful to perform control corresponding to device information outputted from the connected electrical device main body such as an impact tool. Further, since the battery pack is used when connected to various electrical device main bodies, convenience would be improved if sensors capable of detecting information other than impact detection are provided.

The present invention has been made in view of the above background, and an objective thereof is to provide a battery pack that enables control corresponding to device information outputted from a connected electrical device main body while suppressing an increase in size of an electrical device, and an electrical device using the battery pack.

Another objective of the present invention is to provide a battery pack with improved convenience and an electrical device using the battery pack.

Another objective of the present invention is to provide a battery pack and an electrical device that support control on the electrical device main body side by the battery pack by providing a microcomputer and one or more sensors on the battery pack side and performing communication between the battery-side microcomputer and a main body-side microcomputer.

Means for Solving Problems

The following describes representative features in the invention disclosed in this application.

According to one feature of the present invention, a battery pack is capable of being mounted to an electrical device main body, the configuration including: a sensor part configured to collect and output physical information that arises due to external factors of the battery pack; a battery pack-side control part that is connected to the sensor part and to which device information outputted from a device-side control part is inputted; and the device-side control part. The battery pack-side control part controls the electrical device main body according to the device information and the physical information. Herein, the physical information that arises due to external factors includes information related to a position, a posture, or an acceleration of the battery pack. The battery pack-side control part is configured to be capable of communicating with the device-side control part.

According to another feature of the present invention, the battery pack has a plurality of connection terminals made of metal that enable electrical connection with the electrical device main body, and performs communication with the electrical device main body using a part of the connection terminals. The battery pack-side control part is configured to be capable of changing an operating condition of the electrical device main body according to the physical information, and is configured to be capable of changing an operating condition of the electrical device main body according to the electrical device main body connected. Further, an electrical device is configured to include an electrical device main body that includes a battery pack mounting part to which a battery pack is capable of being mounted, and a load part driven by the battery pack; and the battery pack.

According to still another feature of the present invention, a device-side control part is included, and a battery pack is configured to include: a sensor part configured to collect and output physical information that arises due to external factors of the battery pack; and a battery pack-side control part that is connected to the sensor part and to which device information outputted from the device-side control part is inputted. The battery pack-side control part is configured (1)

to transmit, to the electrical device main body, a signal controlling the electrical device main body using an output detected by the sensor part in a case where the device-side control part enables control using the sensor part, and (2) not to perform detection with the sensor part in a case where the device-side control part is not capable of performing control using the sensor part.

According to still another feature of the present invention, the battery pack outputs a signal that prohibits driving of the electrical device main body in a case where the information outputted from the sensor part does not match the identification information. The identification information includes an operation permission range based on the mounting direction of the battery pack. The battery pack is configured to output a signal that prohibits driving of the electrical device main body in a case where the information outputted from the sensor part falls outside the operation permission range. A battery pack includes: a sensor part configured to collect and output physical information that arises due to external factors of the battery pack; and a battery pack-side control part that is connected to the sensor part and to which identification information outputted from the device-side control part and identifying a mounting direction of the battery pack is inputted. The battery pack-side control part controls the electrical device main body based on the identification information and the physical information.

Effects of Invention

According to the present invention, it is possible to provide a battery pack and an electrical device that enable optimal control corresponding to the connected device main body while suppressing an increase in size of the electrical device. Further, it is possible to provide a battery pack with improved convenience and an electrical device using the battery pack. Furthermore, the battery pack-side control part may generate a signal that controls the electrical device main body according to the physical information detected by the sensor. It is possible to realize an electrical device including such a battery pack and an electrical device main body including a battery pack mounting part to which the battery pack is capable of being mounted, and a load part driven by the battery pack.

BRIEF DESCRIPTION OF DRAWINGS

FIG. 11A shows a state at the start of a drilling operation, and FIG. 11B shows a state at the end of the drilling operation.

FIG. 12A is a left side view, and FIG. 12B is a rear view.

FIG. 13A is a left side view, and FIG. 13B is a rear view.

FIG. 14A shows a state in which a hammer is at an initial position, and FIG. 14B shows a state in which the hammer collides with a cam end and vibrations different from those at the time of a normal striking operation occur throughout the device.

DESCRIPTION OF EMBODIMENTS

Embodiment 1

Hereinafter, embodiments of the present invention will be described based on the drawings. In the figures below, the same parts will be labeled with the same reference signs, and repeated descriptions will be omitted. Further, in this specification, front, rear, left, right, up, and down directions refer to directions shown in the figures.

Figure 1:
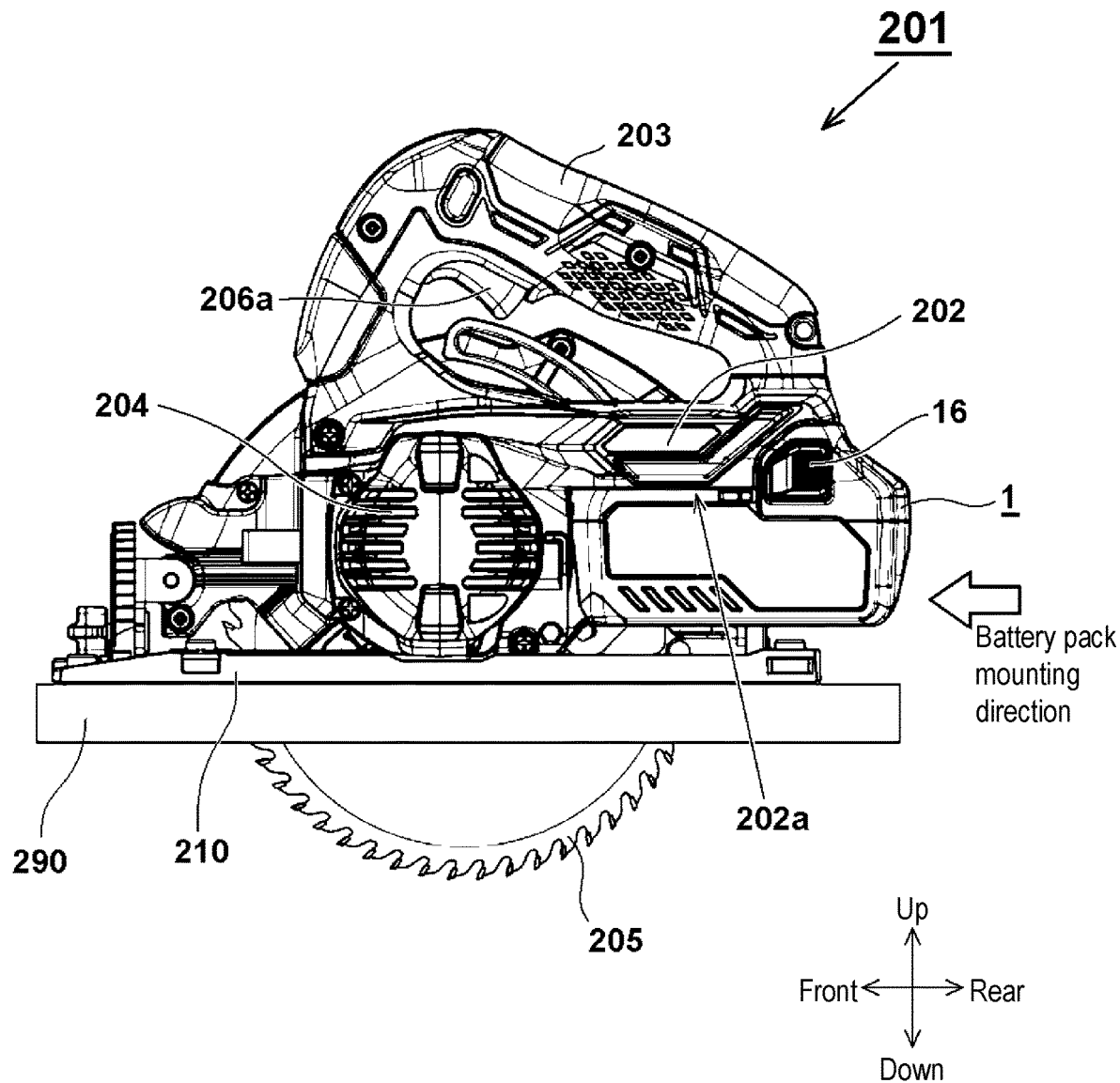
FIG. 1 is a left side view of an electrical device 201 according to an embodiment of the present invention.

FIG. 1 is a side view of an electrical device 201 according to an embodiment of the present invention. Herein, an example of a circular saw, which is a power tool, is shown as an example of the electrical device 201. The circular saw (201) is a tool for cutting a cut object such as wood by rotating a saw blade 205, which is an operating device having a disk shape and formed with multiple spire-shaped blades on an outer circumferential side, at high speed by a motor 204. The motor 204 is arranged substantially at a center at a main housing 202 made of synthetic resin. The motor 204 has a rotation shaft (not visible in the figure) extending horizontally in the left-right direction, and an output of the rotation shaft is decelerated and transmitted to a drive shaft of the saw blade 205. A base 210, which serves as a sliding surface against a cut material 290, is provided at a bottom surface of the main housing 202. An elongated opening (not visible in the figure) extending in a longitudinal direction is formed at a substantially central part of the base 210, and a part of the saw blade 205 protrudes downward from the opening. Thus, it is possible to cut the cut material (target material) 290 such as wood by the saw blade 205 protruding downward from this base 210. Although not shown in FIG. 1, a protective cover that protects the blade of the saw blade 205 from being exposed when the saw blade 205 is not pressed against the cut object is provided around the lower side of the saw blade 205.

A handle part 203 for an operator to hold is formed above the main housing 202, and a trigger lever 206a for turning on rotation of the motor 204 is provided at the handle part 203. It is widely known that the power source of the electrical device 201 may be a commercial power source and a battery pack, and in this embodiment, a detachable battery pack 1 is used. Thus, a battery pack mounting part 202a for mounting the battery pack 1 is provided at a rear portion of the main housing 202, and the battery pack 1 is capable of being mounted to the battery pack mounting part 202a. The battery pack 1 is slid from a rear side to a front side to be attached to the battery pack mounting part 202a. When the battery pack 1 reaches a predetermined position, a latch mechanism including a latch button 16 operates to fix the battery pack 1 to the main housing 202 such that the battery pack 1 does not fall off, and the battery pack 1 is held at a main body part of the electrical device 201. In this specification, a "main body part (of the electrical device)" refers to a portion of the electrical device at which the battery pack is not mounted (a portion of the electrical device excluding the battery pack). Further, hereinafter, the main body part of the electrical device 201 may be referred to as an "electrical device main body 201", and the electrical device main body 201 and the battery pack 1 may be collectively referred to as an electrical device. When removing the battery pack 1 from the main body part of the electrical device 201, while pressing in the latch button 16 for releasing the latch provided on both left and right sides of the battery pack 1, the battery pack 1 is slid toward the rear side (a direction opposite to the mounting direction) with respect to the main body part.

The operator may perform a straight cut on a cut object by pressing the base 210 and the saw blade 205 against the cut object and operating the trigger lever 206a while gripping the handle part 203. The cutting direction is a forward direction of the electrical device 201.

Figure 2:
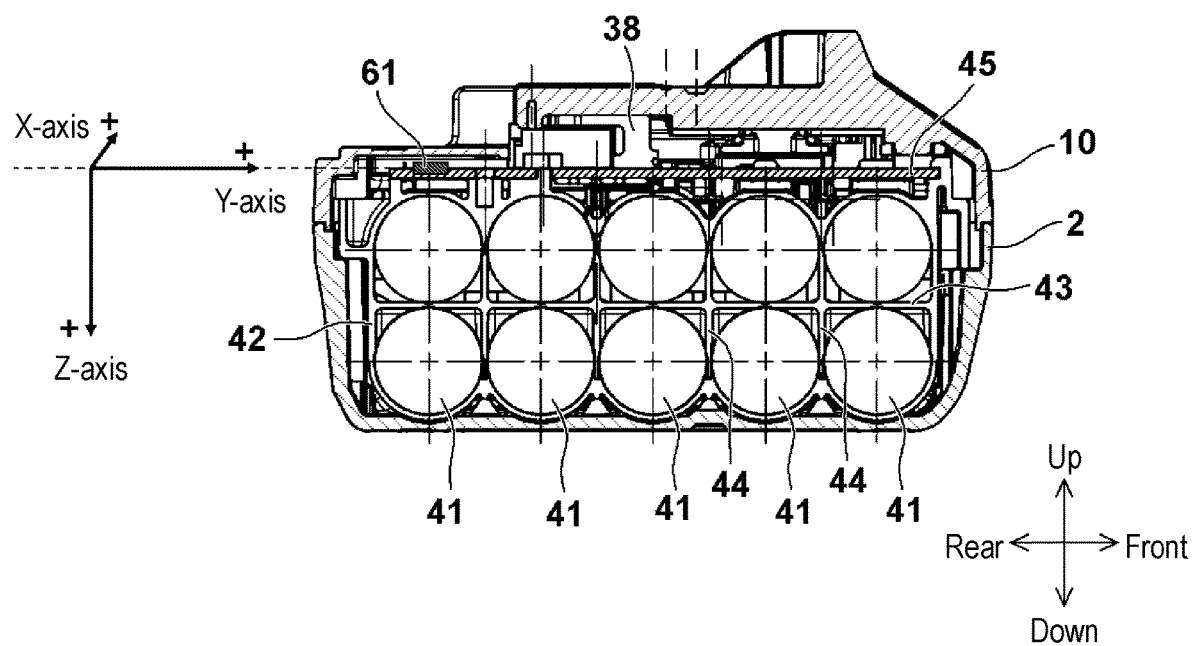
FIG. 2 is a longitudinal sectional view of a battery pack 1 in FIG. 1.

FIG. 2 is a longitudinal sectional view of the battery pack 1. Ten battery cells 41 in cylindrical shapes are accommodated in an internal space formed by an upper case 10 and a lower case 2. The ten battery cells 41 are fixed by a separator 42 in a state of being stacked in two stages each including five battery cells 41. The type, size, and quantity of the battery cells 41 are configured in any manner, and, for example, the battery cell 41 may be a lithium-ion battery cell capable of multiple-time charging and discharging, with a diameter of 18 mm and a length of 65 mm, or called an 18650 size. Herein, battery cell sets each composed of five battery cells connected in series are connected in parallel to output a direct current of a rated voltage 18V. An up-down interval between the battery cells 41 adjacent in the up-down direction is partitioned by an up-down partition wall 43 in a flat plate shape, and a front-rear interval between the battery cells 41 adjacent in the front-rear direction is partitioned by a front-rear partition wall 44 in a flat plate shape, and the adjacent battery cells 41 are held such that they do not come into contact with each other.

A circuit board 45 is fixed to an upper side of the separator 42. The circuit board 45 is a printed circuit board (PCB) and is mounted with various electronic components such as a battery protection IC, a microcomputer, a storage memory, a PTC thermistor, a resistor, a capacitor, a fuse, a light emitting diode, etc. Further, a plurality of connection terminals made of metal (herein, only an LD terminal 38 is visible) that fit with connection terminals on an electrical device main body 201 side are fixed at the circuit board 45. A circuit pattern (not shown) is formed on the circuit board 45 to electrically connect a positive electrode side output and a negative electrode side output of the battery cell 41 to a connection terminal group. A sensor 61 according to this embodiment is further mounted to the circuit board 45. The sensor 61 is one of sensors referred to as a three-axis acceleration sensor, and detects a three-dimensional inertial motion (translational motion in directions of three orthogonal axes of X, Y, and Z shown in the figure) to measure an acceleration. The sensor 61 corresponds to a "sensor part" in the present invention.

Figure 3:
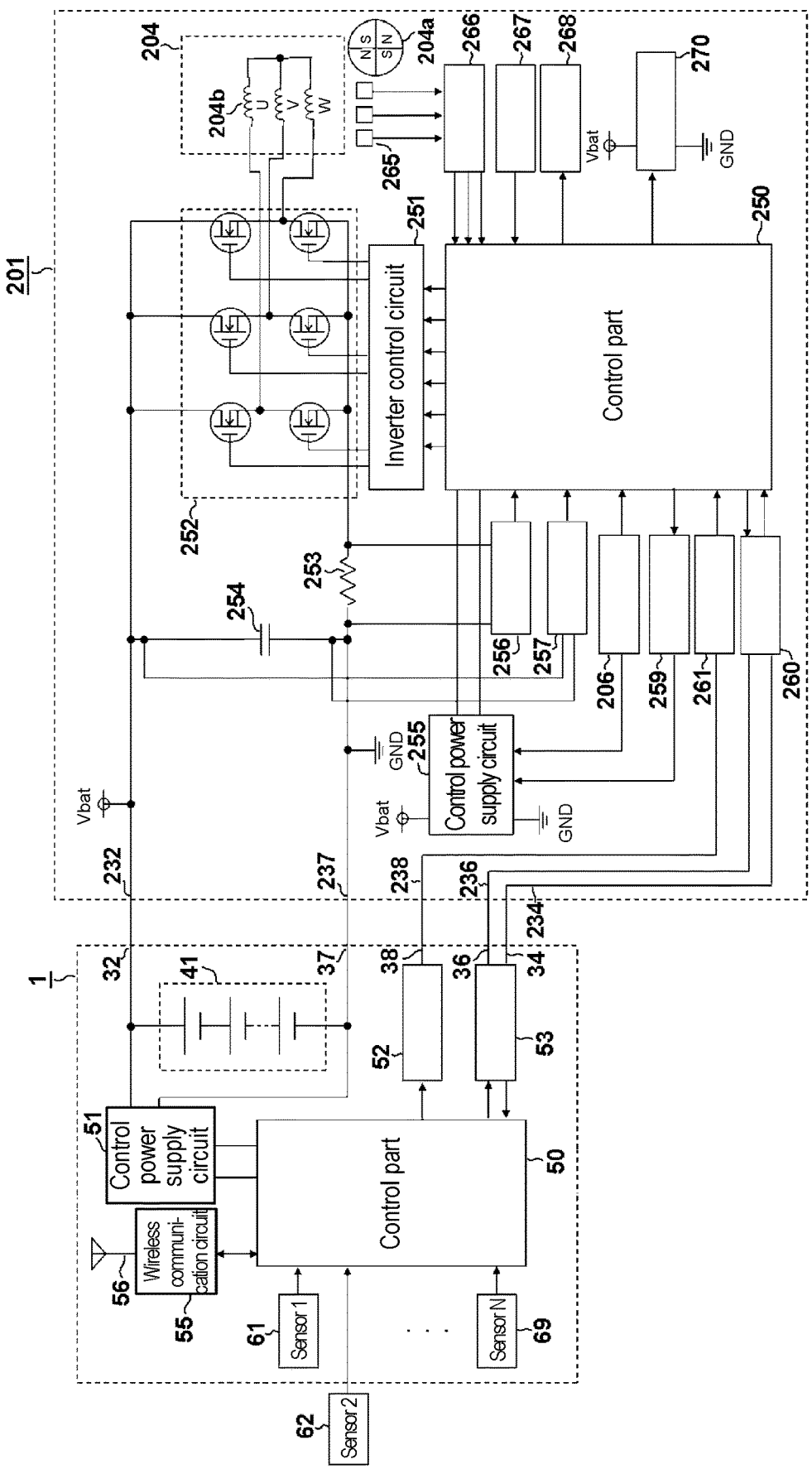
FIG. 3 is a circuit diagram of the battery pack 1 and the electrical device 201 shown in FIG. 1.

FIG. 3 is a circuit diagram of the battery pack 1 and the electrical device main body 201. The battery pack 1 is provided with sensors 61 to 69 for sensing, such as an acceleration sensor, and is configured to control the main body part of the electrical device 201 according to physical information obtained from these sensors. The battery pack 1 is electrically connected to the electrical device main body 201 via a plurality of connection terminals (32, 34, 36 to 38, etc.). A positive electrode terminal 32 and a negative electrode terminal 37 are power supply terminals connected to a positive electrode and a negative electrode of the battery cell 41, and are connected to a positive electrode input terminal 232 and a negative electrode input terminal 237 of the electrical device main body 201. The positive electrode side output of the battery cell 41 is connected to the positive electrode terminal 32, and the negative electrode side output is connected to the negative electrode terminal 37. The battery pack 1 is further provided with a positive electrode terminal for charging (so-called C+ terminal) as a power terminal, which is not shown herein.

The battery pack 1 is provided with at least one or more sensors 61 to 69 for sensing which are built-in or externally attached. A conventional battery pack 1 is provided with a sensor for measuring a voltage supplied from the battery cell 41, a sensor for measuring a current, and a sensor for measuring a temperature. The sensors 61 to 69 of this embodiment are not intended to perform detection targeting internal factors (battery cell 41) of the battery pack 1, but are provided to detect any one or more of physical, optical, electrical, magnetic states, etc., that are attributed to outside of the battery pack 1. Examples of the sensor 61 to the sensor 69 include an acceleration sensor, a distance sensor (ranging sensor), a light sensor, a human detecting sensor, a position sensor, a sound sensor, an image sensor, an illuminance sensor, and a magnetic sensor, which detect physical information in an environment in which the battery pack 1 is exposed and physical information applied to the battery pack 1 due to an operation on the main body side of the electrical device 201. Any number of sensors among the sensors 61 to 69 may be provided at the battery pack 1. One of them may be provided or a plurality of them may be provided. Further, like the secondly numbered sensor 62, the sensor may be attached on the outer side in a so-called externally attached state instead of being provided inside the case of the battery pack 1. In that case, to perform electrical wiring between the sensor 62 and a control part 50, a connector for connection may be provided at a position accessible from outside the battery pack 1. Serving the purpose of sensing physical information, each of the sensors 61 to 69 is arranged at a position capable of achieving this purpose and capable of being accommodated in or attached to the battery pack 1.

The control part 50 manages charging and discharging of the battery cell 41 and processes the physical information acquired by the sensors 61 to 69. The control part 50 corresponds to a "battery pack-side control part" of the present invention. A control power supply circuit 51 converts the power of the battery cell 41 into a constant voltage of 3.3 V or 5 V and outputs to the control part 50. The control part 50 is mounted to the circuit board 45 (see FIG. 2) and is composed of a microcomputer, a ROM for storing processing programs and control data, a RAM for temporarily storing data, a timer, etc. The outputs inputted from the sensors 61 to 69 is A/D converted by the microcomputer of the control part 50, and are subjected to sampling, noise removal processing, and other necessary processing. The control part 50 is further provided with a wireless communication circuit 55. The wireless communication circuit 55 is a circuit for short-range wireless communication such as Bluetooth (registered trademark). The wireless communication circuit 55 is provided with an antenna 56 to enable communication within a distance of several tens of meters.

The microcomputer of the control part 50 processes signals inputted from the sensor 61 to the sensor 69 to perform operation control on the main body part of the electrical device 201 to which the battery pack 1 is mounted. In order for the microcomputer (control part 50) on the battery pack side to control the main body part of the electrical device 201, the control part 50 is configured to be capable of communicating with the control part 250 on the electrical device main body 201 side, and three terminals for communication are used. One of the terminals for communication is a second signal terminal (T terminal) 34. This terminal transmits a signal that serves as identification information of the battery pack 1 to the electrical device main body 201, and is also used in this embodiment as a communication terminal for transmitting information of the battery pack 1 side via a tool main body communication circuit 53 which performs wired communication. Another of the terminals for communication is a first signal terminal (LS terminal) 36, which is a signal terminal for sending out an output of a thermistor (temperature sensing element) (not shown) provided for measuring the temperature of the battery cell 41, but is also used as a communication terminal for receiving information on the electrical device main body 201 side via the tool main body communication circuit 53. The tool main body communication circuit 53 is a circuit for performing bidirectional wired communication with a battery communication circuit 260 of the electrical device main body 201 using signal terminals of the LS terminal 36 and the T terminal 34, which have been conventionally used. A third signal terminal (LD terminal) 38 is a signal terminal for outputting, via a control signal output circuit 52, an abnormality stop signal for protecting the battery cell 41 by the control part 50.

The electrical device main body 201 is controlled by the control part 250. The control part 250 corresponds to a "device-side control part" of the present invention. A control power supply circuit 255 is provided for operating the control part 250. The control power supply circuit 255 is a power supply for generating a constant voltage of low voltage (e.g., 3.3 V or 5 V) from a direct current supplied to the positive electrode input terminal 232 and the negative electrode input terminal 237. In the case where the electrical device main body 201 is an impact tool as shown in FIG. 1, when the battery pack 1 is mounted to the electrical device main body 201 and the trigger lever 206a (trigger switch 206) is first pulled, an ON signal of the trigger switch 206 is inputted to the control power supply circuit 255, so the control part 250 starts up. After the control part 250 starts up, a signal for keeping the control power supply circuit 255 in an ON state is continuously outputted to the control power supply circuit 255 by a self-holding circuit 259. A control signal input circuit 261 is a circuit that determines on signals transmitted from the battery pack 1 side via the third signal terminal (LD terminal) 238 and transmits the signals to the control part 250. The battery communication circuit 260 is a circuit for performing bidirectional communication with the control part 50 of the battery pack 1 using a first signal terminal (LS terminal) 236 and a second signal terminal (T terminal) 234.

Although not shown, the control part 250 is composed of a microcomputer for outputting drive signals based on processing programs and data, a ROM for storing processing programs and control data, a RAM for temporarily storing data, a timer, etc. In this embodiment, the motor 204 is composed of a three-phase brushless DC motor and is driven by an inverter circuit 252. The motor 204 is of a so-called inner rotor type and includes a rotor 204a composed of permanent magnets (magnets) including multiple sets (two sets in this embodiment) of N poles and S poles, and a stator 204b composed of star-connected three-phase stator windings U, V, and W. When the trigger switch 206 turns on, signals from three Hall elements 265 are detected by a rotation position detection circuit 266, and the control part 250, which receives the detection signals, calculates the direction and time of energization to the stator windings U, V, and W to control the motor 204 to rotate at a predetermined rotational speed.

The inverter circuit 252 is composed of six switching elements (Q1 to Q6) such as FETs connected in a three-phase bridge configuration. Each gate of the switching elements Q1 to Q6 is connected to an inverter control circuit 251, and each drain or each source of the switching elements Q1 to Q6 is connected to the star-connected stator windings U, V, and W. In this manner, based on the output signal of the Hall element 265 which detects the rotation position of the motor 204, the DC power inputted to the inverter circuit 252 is supplied to the stator 204b as three-phase (U phase, V phase, and W phase) voltages Vu, Vv, and Vw by the microcomputer included in the control part 250.

Herein, a PWM signal is supplied to either of the positive power supply-side switching elements Q1 to Q3 and the negative power supply-side switching elements Q4 to Q6 of the inverter circuit 252, and controls the power supplied from the direct current to each stator winding U, V, and W by high-speed switching of the switching elements Q1 to Q3 or the switching elements Q4 to Q6. In this embodiment, since a PWM signal is supplied to the negative power supply-side switching elements Q4 to Q6, it is possible to adjust the power supplied to each stator winding U, V, and W to control the rotational speed of the motor 204 by controlling the pulse width of the PWM signal.

The current value supplied to the motor 204 is measured by a current detection circuit 256 using a shunt resistor 253, and this value is fed back to the control part 250. Further, the voltage value applied to the inverter circuit 252 is monitored by the control part 250 by measuring the voltage across a capacitor 254 for smoothing with a voltage detection circuit 257. An illumination LED 270 is a light emitting device that illuminates a location where an operation is performed with a tip tool. The microcomputer of the control part 250 detects that the operator has operated an illumination button (not shown) provided at the electrical device main body 201, and according to this instruction, the control part 250 turns on or off the illumination LED 270. Further, the control part 250 may notify the operator that the electrical device main body 201 is in a specific state by turning on a predetermined lighting mode (flashing, changing display color, etc.) according to communication signals from the microcomputer (control part 50) of the battery pack 1. An operation mode switch 267 is a switch for setting a tightening strength and a tightening mode of the impact tool. The operation mode set by the operation mode switch 267 is displayed by a corresponding mode display LED 268 indicating which operation mode has been selected.

Figure 4:
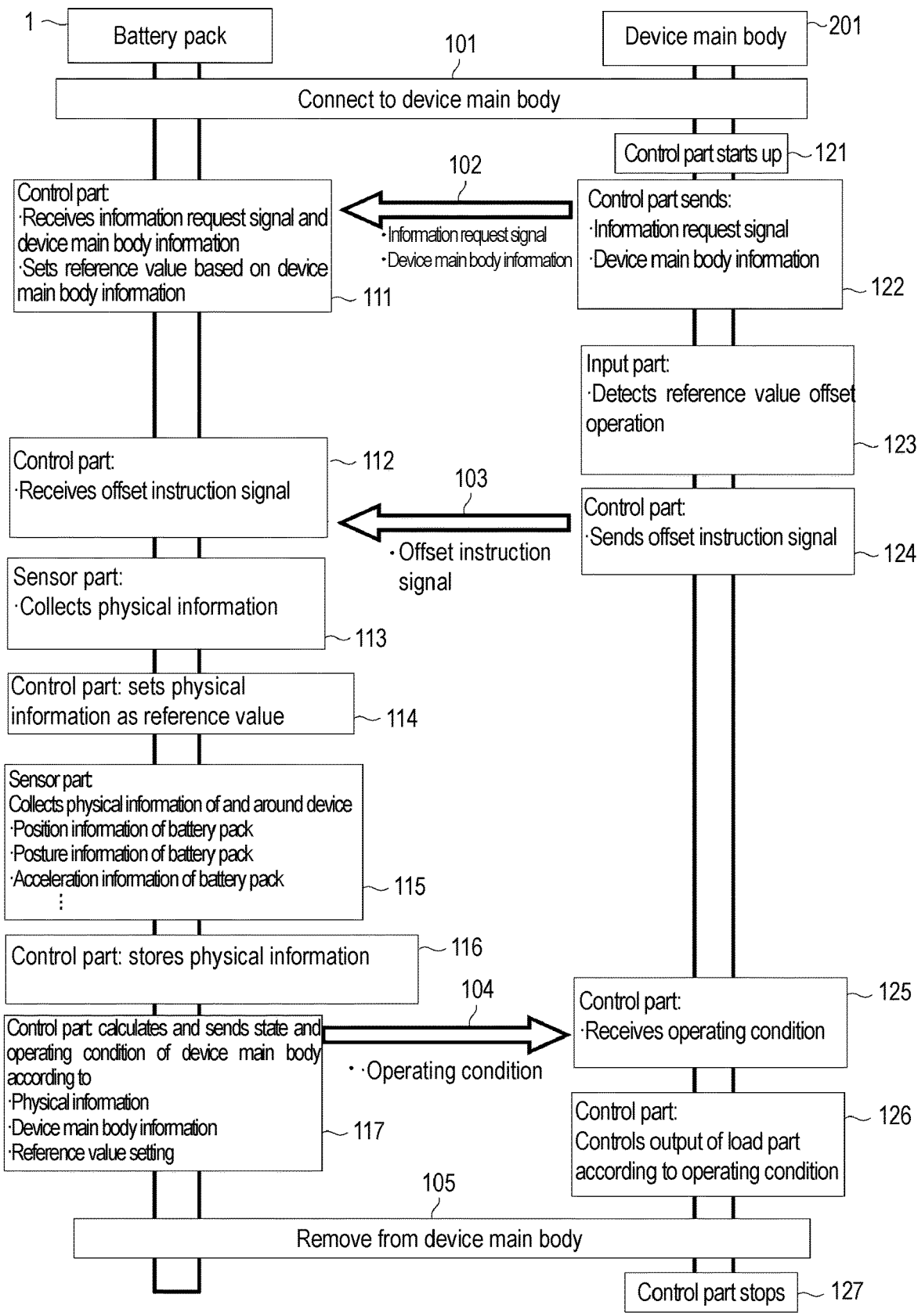
FIG. 4 is a state transition diagram showing an operation procedure of the battery pack 1 and the electrical device 201 according to this embodiment.

Next, an operation procedure of the battery pack 1 and the electrical device main body 201 will be described with reference to a state transition diagram of FIG. 4. The transition diagram of FIG. 4 starts as the battery pack 1 is mounted to the electrical device main body 201 (step 101), a main switch of the electrical device main body 201 is turned on, and the microcomputer of the control part 250 starts up (step 121). In the case of a device that does not include a main switch at the electrical device main body 201, the operation starts with startup of the microcomputer of the control part 250 when the trigger lever 206a is first pulled. Initially, the control part 250 on the electrical device main body 201 side transmits an "information request signal" for instructing a transmission request for information acquired by the sensors 61 to 69 to the battery pack 1 (steps 122 and 102). The information to be used does not need to be all the sensor information, and required sensors among the sensors 61 to 69 may be selected. Further, in addition to the "information request signal", "device main body information (device information)" for identifying the type of the electrical device main body 201 is also transmitted together. This transmission is performed via the first signal terminal 36 and the first signal terminal 236. The "device main body information" is composed of a model name of the electrical device main body, information of the electrical device main body required for utilizing the sensor information, parameters required for controlling the electrical device main body, etc. In the case of an old model in which the electrical device main body mounted with the battery pack 1 is not capable of utilizing the information of the sensors 61 to 69 from the battery pack 1, since it is not possible to transmit an "information request signal" to the battery pack 1 side, subsequent steps are skipped, and the electrical device main body operates in the same manner as a conventional electrical device main body without using the sensor information from the battery pack 1.

Upon receiving the "information request signal" and the "device main body information" by the control part 50 of the battery pack 1, the control part 50 of the battery pack 1 sets a "reference value" for performing control on the electrical device main body 201 based on the "device main body information" (step 111). The reference value is a value indicating a correct main body posture during operation that is determined for each model. In a device such as a circular saw for which the main body posture during operation is determined according to the model, the reference value is used as a comparison value when detecting an abnormal posture. On the other hand, in a device such as a driver drill for which the operating posture is not determined, since an operation start posture is taken as the reference value, a reference value offset operation (step 123 to be described later) is performed from the main body side of the electrical device 201, and the posture at that time is set as the reference value. When the operator wants to take a current state as the reference upon detection of a tilt of the electrical device main body 201, he or she performs a reference value offset operation from the main body side of the electrical device 201 (step 123). The reference value offset operation is an operation in which the operator positions the main body part of the electrical device 201 at a reference position by determining the posture of the main body part of the electrical device 201, and operates (presses) a specific button provided at the main body part of the electrical device 201. This is because it is not possible to determine which position is to be taken as the reference without the instruction from the operator such as this button operation on the main body side of the electrical device 201.

To perform the reference value offset operation, when the operator operates (presses) a specific button (not shown), a dedicated or shared lamp may be lit to indicate that the offset operation has been performed. In this manner, for example, each time a drilling operation is performed with an electrical drill, the posture of the electrical device main body may be reset by specifying with the button for the offset operation.

The control part 250 of the electrical device main body 201 which detects a button operation for reference value setting transmits an "offset instruction signal" to the battery pack 1 (step 124). This transmission is performed via the first signal terminal 36 and the first signal terminal 236 (step 103). There may be cases where an offset operation of the reference value of the electrical device main body 201 is not required. In such cases, since no specific button operation is performed by the operator, steps 124 and 103 are skipped.

The control part 50 of the battery pack 1 which receives the "offset instruction signal" (step 112) performs collection of various physical information from the outputs of the sensors 61 to 69 (step 113), and takes the physical information value obtained at this time as the reference value to perform detection of physical information using the sensors 61 to 69 thereafter (step 114). This reference value is stored to a storage device (not shown) included in the control part 50 of the battery pack 1 and is maintained until the reference value is updated next time.

Upon completion of the preparation stage before an individual operation with the electrical device main body 201 is performed as described above, the operator starts the operation of the electrical device main body 201. For example, in the case of a circular saw or an impact tool, the trigger lever 206a is operated to rotate the motor 204 with the saw blade or the tip tool pressed against the target material. During this operation, the control part 50 of the battery pack 1 collects physical information of the main body part of the electrical device 201 and around the battery pack 1 (step 115). Examples of the information collected herein include position information of the battery pack 1, posture information of the battery pack 1, and acceleration information of the battery pack 1. This "physical information" does not arise due to the battery pack 1 (based on internal factors), but arises and is detected due to an external factor which is the operation of the electrical device main body 201. Although the measurement spots of the sensors are located on the battery pack 1 side, these pieces of information are also information on the electrical device main body 201 to which the battery pack 1 is mounted. Next, the detected physical information of the battery pack 1 is stored to a storage device (not shown) included in the control part 50 of the battery pack 1 (step 116). The reason for storing the physical information is as follows. Since sensor values are always changing, when performing determination, information right before the determination is temporarily stored and processing is performed as necessary, and then the determination is performed.

The control part 50 of the battery pack 1 calculates a state and an operating condition of the electrical device main body 201 according to the detected physical information, the device main body information of the electrical device main body 201, and the set reference value setting (step 117). The state and the operating condition will be described later with reference to FIG. 6A to FIG. 11B. The calculated operating condition of the electrical device main body 201 is sent out to the control part 250 of the electrical device main body 201 via the second signal terminal 34 and the second signal terminal 234 (step 104). The control part 250 of the electrical device main body 201 which receives the "operating condition" controls an output of a load part according to the operating condition (steps 125 and 126). In this manner, the control part 250 of the electrical device main body 201 acquires information (operating condition) determined based on the sensor information detected by the battery pack 1, and control is performed in accordance with this information. Subsequently, multiple operations are repeated by repeating steps 112 to 117 and steps 123 to 126. Afterwards, in the case where a main power supply (main switch) of the electrical device main body 201 is turned off, or in the case of an electrical device main body without a main power supply (main switch), the battery pack 1 is removed from the main body of the electrical device main body 201 (step 105), and the operation of the control part 250 of the electrical device main body 201 stops (step 127).

Figure 5:
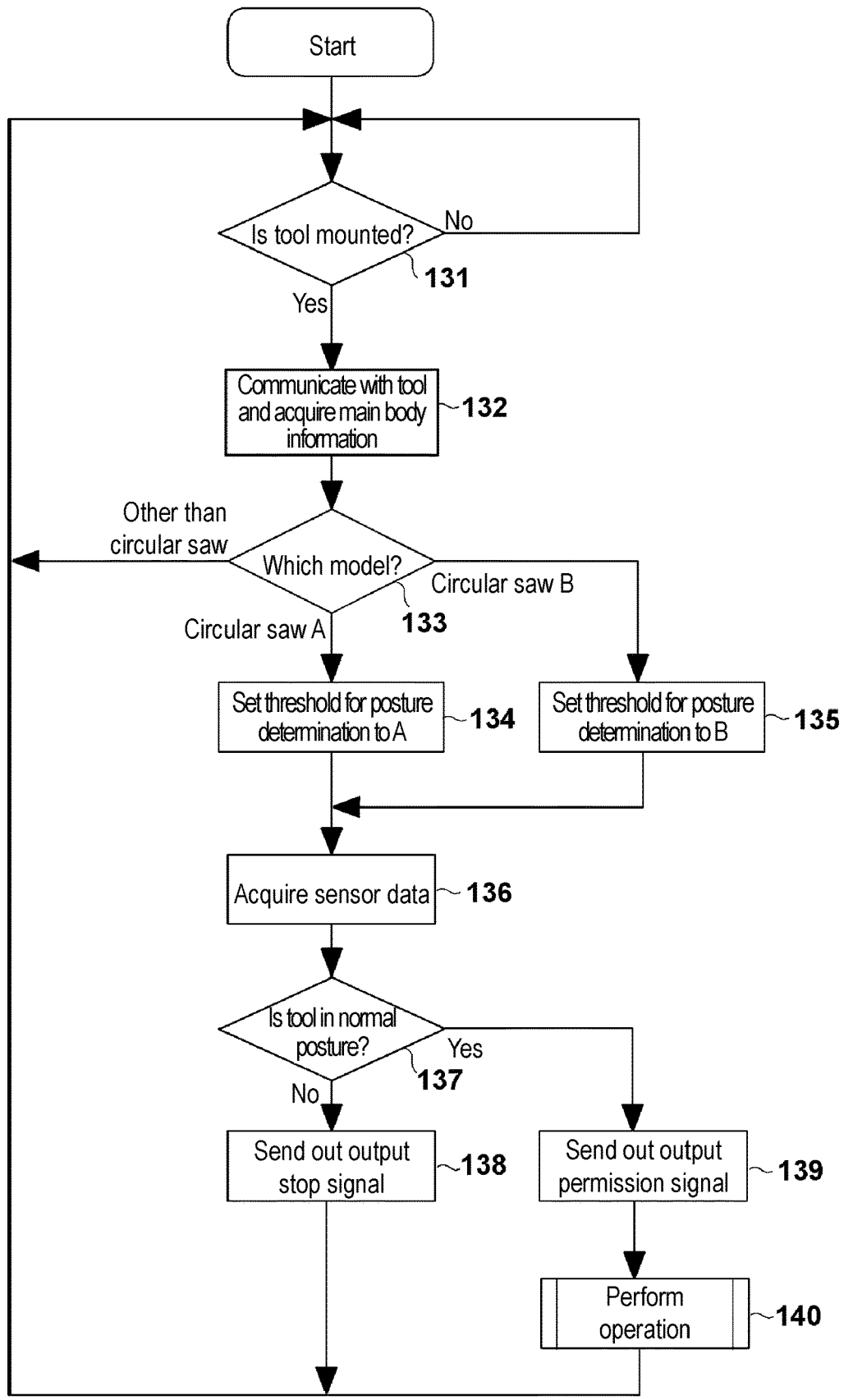
FIG. 5 is a flowchart showing a control procedure of a control part 50 of the battery pack 1 in the process leading up to steps 101 to 117 in FIG. 4.

Next, with reference to the flowchart of FIG. 5, a control procedure of the control part 50 of the battery pack 1 in the process leading up to steps 111 to 117 in FIG. 4 will be described. The control in the flowchart of FIG. 5 is software-controlled by the microcomputer included in the control part 50 executing a computer program. First, the control part 50 determines whether the battery pack 1 is mounted to the electrical device main body 201, that is, a tool such as a circular saw (electrical device main body 201) (step 131). In the case of being not mounted in step 131, the control part 50 stands by until mounting. In the case of being mounted, the control part 50 performs communication with the control part 250 of the electrical device main body 201 and acquires an information request signal and device main body information from the electrical device main body 201 (step 132). In response to the transmission of the information request signal, the control part 50 of the battery pack 1 transmits, to the electrical device main body 201 side, an output signal of a sensor that is present and is requested among the sensors 61 to 69.

Next, using the received device main body information, the control part 50 of the battery pack 1 determines which model the mounted electrical device main body 201 is (step 133). Herein, in the case where the electrical device main body 201 is a first circular saw (circular saw A), a threshold for posture determination of the electrical device main body using sensor values is set to a predetermined value A (step 134), and data of the sensors 61 to 69 after start of operation is acquired (step 136). In step 136, it is not required to obtain outputs of all of the set sensors 61 to 69, and it is sufficient to utilize only the output from the sensor required for the intended control. Similarly, in step 133, in the case where the electrical device main body 201 is a second circular saw (circular saw B), a threshold of posture determination of the electrical device main body using sensor values is set to a predetermined value B (step 135), and data of the sensors 61 to 69 after start of operation is acquired (step 136).

Next, using the acquired sensor information, the control part 50 of the battery pack 1 determines whether the posture of the electrical device main body 201 is in a normal state (step 137). For example, in the case of the circular saw A or B, it is determined whether its posture is within an appropriate range for performing an operation using the output of the acceleration sensor. A specific example of this determination will be described later with reference to FIG. 6A to FIG. 8C. Herein, in the case where the posture of the circular saw A or B is normal, an output permission signal is sent out to the electrical device main body 201 (circular saw A or B) side (step 139), and in the case where the posture is not normal, an output stop signal is sent out to the electrical device main body 201 (circular saw A or B) side (step 138). Although the output permission signal and the output stop signal may be transmitted as any signals, it is possible to use a signal sent via an LD terminal conventionally included in the battery pack 1, i.e., an LD signal that stops the operation of the electrical device main body 201 during overdischarge. In the case where an output permission signal is transmitted (step 139), a user may perform an operation using the electrical device main body 201 (step 140).

In step 133, in the case where the electrical device main body 201 to which the battery pack 1 is mounted is neither the circular saw A nor the circular saw B, the process returns to step 131 assuming a device main body (tool main body) other than these. In the case of a device main body other than the circular saw A and the circular saw B, if an information request signal and device main body information are sent out from the electrical device main body 201 side, the type of sensor information to be used and its threshold may be set using the sent device main body information, and the control in the case where the output value of the sensor reaches the threshold may be set individually for each connected electrical device main body 201. Thus, the sensor information required for each electrical device main body 201 may be stored in a table format to a storage device (not shown) included in the control part 50 of the battery pack 1, and the sensor information may be referred to and the process may branch in steps 132 and 133. In this manner, if reference information for each model of the electrical device main body 201 is stored in advance in the storage device of the control part 50 of the battery pack 1, it is possible to perform control on various electrical device main bodies 201 using the information of multiple sensors 61 to 69 provided at the battery pack 1.

By executing the control shown in FIG. 5 as described above, after setting the type of sensor information and the threshold, the control part 50 of the battery pack 1 continuously monitors the sensor information and may perform control such that the electrical device main body (tool main body) operates upon pulling of the trigger switch 206 (trigger lever 206*a*) when within the operation permission range, and does not operate even if the trigger switch 206

(trigger lever 206a) is pulled when the tilt or the like of the electrical device main body 201 is outside the operation permission range.

Figure 6A:
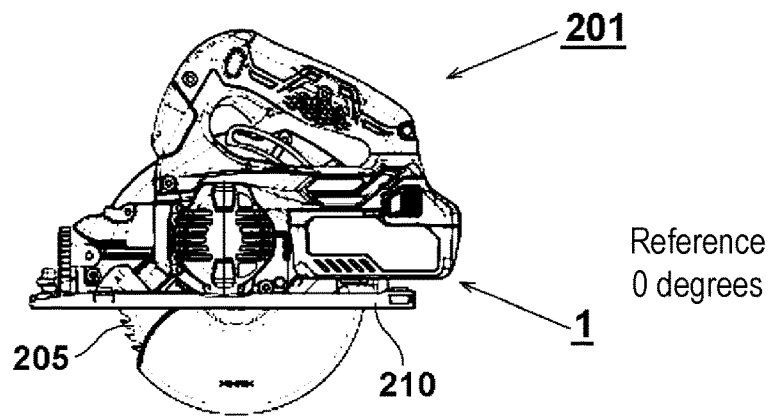
FIG. 6A to FIG. 6C are diagrams for describing a method of controlling the electrical device 201 using the battery pack 1 according to an embodiment of the present invention (Part 1).
Figure 6B:
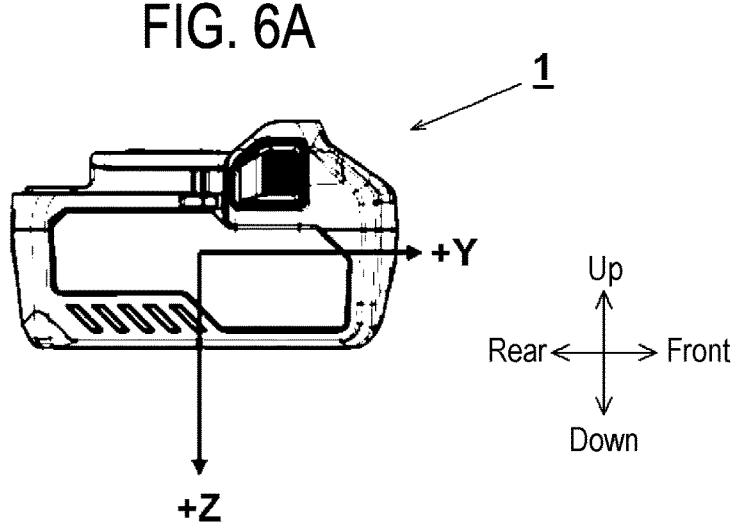
Figure 6C:
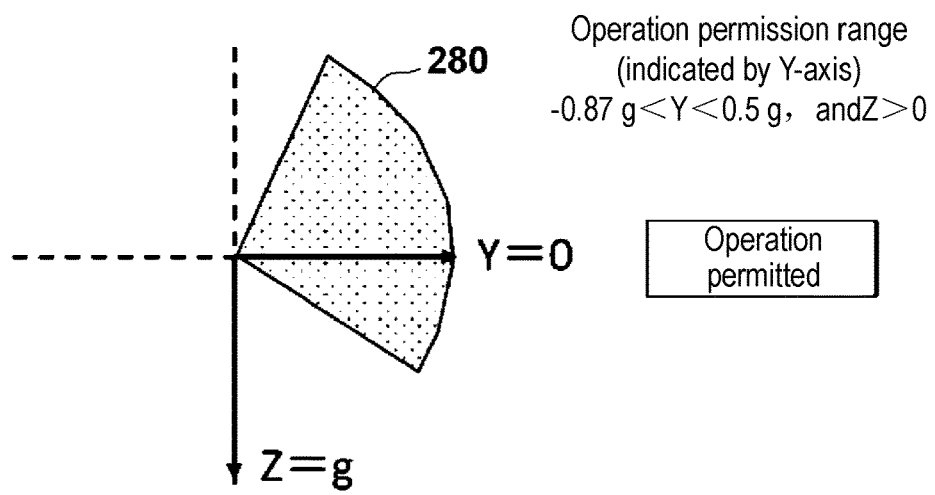

Next, a specific control method in the case where the electrical device main body 201 is a circular saw will be described with reference to FIG. 6A to FIG. 8C. FIG. 6A to FIG. 6C show a case where the posture of the main body part of the electrical device 201 is in a horizontal state, FIG. 6A is a left side view of the circular saw (electrical device 201), and FIG. 6B is the posture of the battery pack 1 when in the state of FIG. 6A. The directions of the Y-axis and the Z-axis shown in FIG. 6B are directions based on the battery pack 1 and indicate directions of the acceleration sensor mounted to the battery pack. Since the battery pack 1 is mounted to the electrical device main body 201 in the horizontal state, when the electrical device main body 201 is in the horizontal state as in FIG. 6A, the battery pack 1 is also in the horizontal state. When a cutting operation is performed with the circular saw in this horizontal state, in the output of the acceleration sensor 61 (see FIG. 2) of the battery pack 1, Z, which is a gravitational component in the +Z direction, is detected as 1 g (g is gravitational acceleration, and 1 g=9.80665 m/s$^2$). Accordingly, it is possible to detect the tilt of the battery pack 1 by the acceleration sensor 61.

The circular saw has a base 210 for sliding on the cut material, and is configured to be capable of changing a protrusion amount (so-called cutting depth) of the saw blade 205 from below the base with respect to the base 210. That is, an angle of a circular saw main body with respect to the base 210 is configured to be changeable. The state in which the protrusion amount of the saw blade 205 from the base 210 is maximum is the state in FIG. 6A. On the other hand, in the state in which the protrusion amount of the saw blade 205 from the base 210 is minimum, the circular saw main body is in a state within an operation permission range 280 (an example of identification information) in FIG. 6C. Thus, within a range in which the cutting depth can be adjusted, the circular saw main body is in a state within the operation permission range 280 and is capable of performing the cutting operation. Hereinafter, in FIG. 6A to FIG. 8C, a mounting direction of the battery pack 1 with respect to the circular saw main body is the front-rear direction (Y-axis direction). The information of the electrical device main body 201 includes the mounting direction of the battery pack 1. This type of circular saw corresponds to the circular saw A in FIG. 5. "Reference 0 degrees" in FIG. 6A corresponds to the threshold A in step 134 in FIG. 5. The operation permission range 280 and the thresholds A and B are examples of the identification information.

In the case where a reference direction of the Y-axis of the acceleration sensor 61 mounted to the battery pack 1, which changes according to the operating posture of the electrical device main body 201, is within the operation permission range 280 shown in FIG. 6C, the control part 50 of the battery pack 1 permits the operation of the electrical device main body 201, that is, executing the procedure of step 139 in FIG. 5. Herein, whether it is "within the operation permission range 280" may be determined according to the Y component and the Z component in the output of the acceleration sensor 61, and is determined in the case where −0.87 g<Y<0.5 g and Z>0. In the diagram of FIG. 6C, the horizontal axis dotted line is an absolute Y-axis direction (one direction passing through a horizontal plane), and the vertical axis dotted line is an absolute Z-axis direction (one direction passing through an extending plane). In the posture of the electrical device 201 in FIG. 6A, due to gravitational acceleration, Y=0 and Z=+g, which falls within the range of the determination condition described above, so the operator may continue the operation with the electrical device main body 201 thereafter.

Figure 7A:
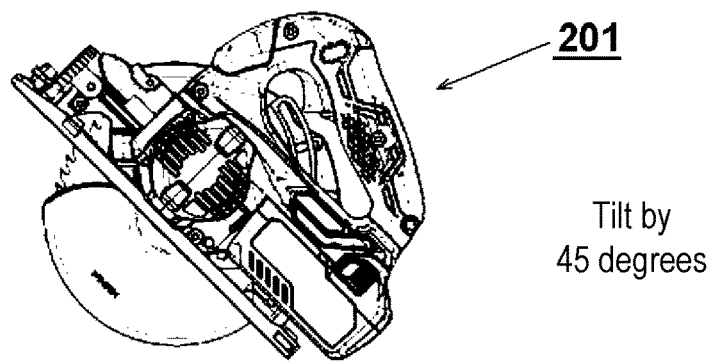
FIG. 7A to FIG. 7C are diagrams for describing a method of controlling the electrical device 201 using the battery pack 1 according to an embodiment of the present invention (Part 2).
Figure 7B:
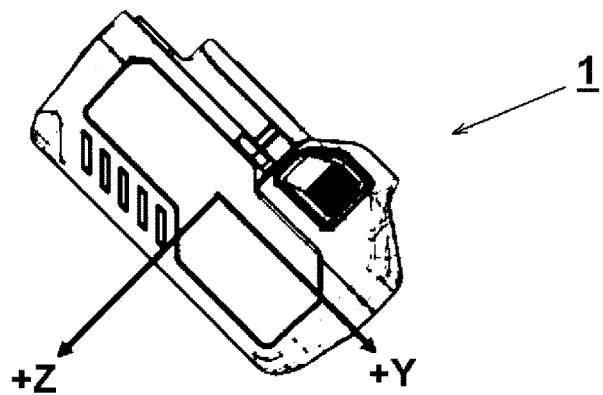
Figure 7C:
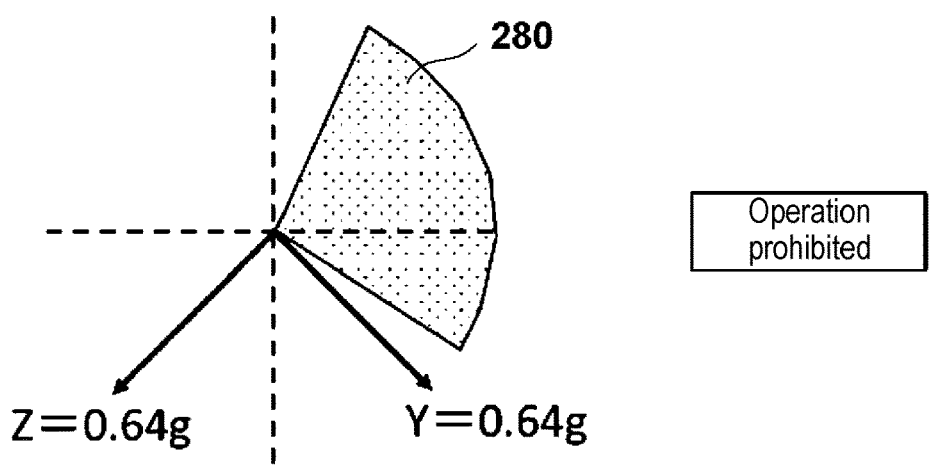

FIG. 7A to FIG. 7C are a state in which the posture of the front side of the main body part of the electrical device 201 is tilted upward by about 45 degrees, FIG. 7A is a left side view of the circular saw (electrical device main body 201), and FIG. 7B is the posture of the battery pack 1 when in the state of FIG. 7A. As can be clearly seen in comparison with the state in FIG. 6A to FIG. 6C, since the battery pack 1 in the case of this posture becomes the same posture as shown in FIG. 7B together with the electrical device main body 201, due to the influence of gravitational acceleration, the detection values of the acceleration sensor 61 become 0.64 g in the Z-axis direction and 0.64 g in the Y-axis direction as shown in FIG. 7C. Since this falls outside the range of the determination condition described above, the control part 50 of the battery pack 1 determines that the operation of the electrical device main body 201 should be prohibited (corresponding to step 137 in FIG. 5), and sends out an output stop signal to the electrical device main body 201 (see step 138 in FIG. 5).

Figure 8A:
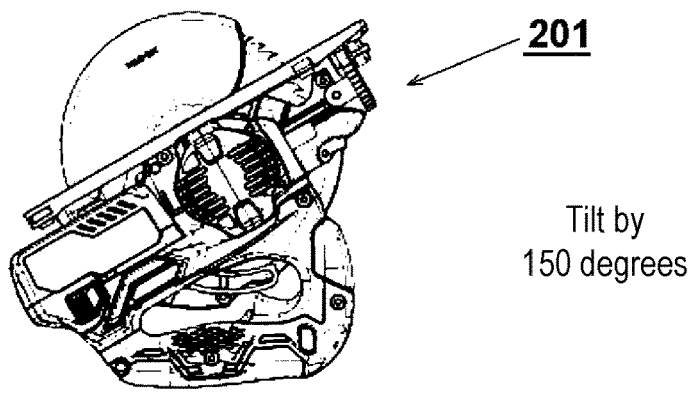
FIG. 8A to FIG. 8C are diagrams for describing a method of controlling the electrical device 201 using the battery pack 1 according to an embodiment of the present invention (Part 3).
Figure 8B:
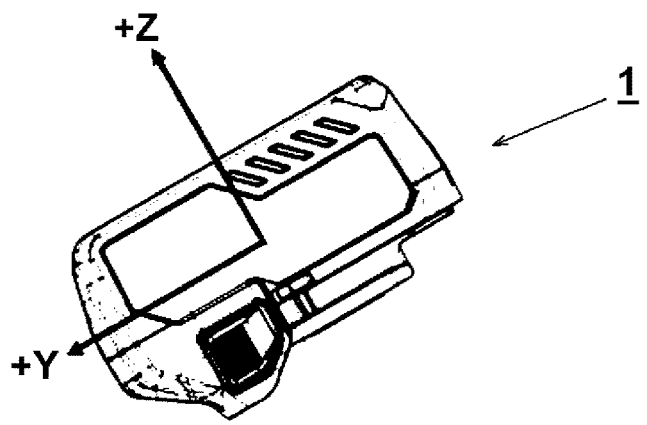
Figure 8C:
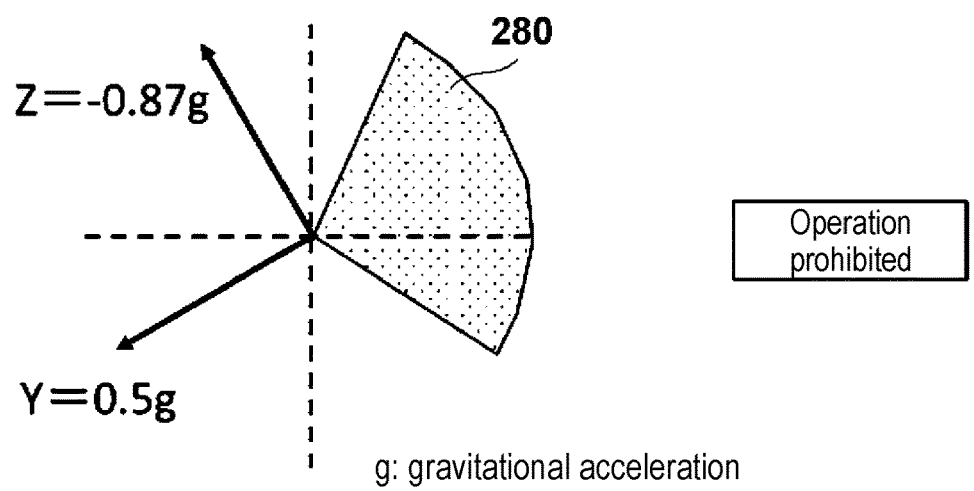

FIG. 8A to FIG. 8C are a state in which the posture of the main body part of the electrical device 201 has rotated by about 150 degrees from the state of FIG. 6A. This state corresponds to an operation state in which the operator uses the electrical circular saw to cut branches of trees or to cut wood on the ceiling from below. FIG. 8A is a left side view of the circular saw (electrical device main body 201), and FIG. 8B is the posture of the battery pack 1 when in the state of FIG. 8A. In the battery pack 1 in the case of the posture in FIG. 8A, due to the influence of gravitational acceleration, the detection values of the acceleration sensor 61 become −0.87 g in the Z-axis direction and 0.5 g in the Y-axis direction. The detection value in the Z-axis direction becomes a negative value because the sensor 61 is turned upside down. Since this falls outside the range of the determination condition described above, the control part 50 of the battery pack 1 determines that the operation of the electrical device main body 201 should be prohibited (corresponding to step 137 in FIG. 5), and sends out an output stop signal to the electrical device main body 201 (see step 138 in FIG. 5).

The control has been described above with reference to FIG. 6A to FIG. 8C in which the control part 50 of the battery pack 1 performs posture determination of the circular saw, and in the case where the electrical device main body 201 assumes an inappropriate posture, the operation of the electrical device main body 201 is stopped. With this control, it is possible to effectively prohibit an operation that operates the circular saw in an inappropriate posture using the battery pack 1 attached with a sensor. In the description with reference to FIG. 6A to FIG. 8C, the detection result in the X-axis direction has not been referred to for simplification of description, but it is also possible to perform advanced control according to further posture determination with reference to the detection results of all three axes of the X-axis, the Y-axis, and the Z-axis of the acceleration sensor 61. Further, in addition to the acceleration sensor 61, the output of any of the other sensors 62 to 69 may also be used in combination to control the operation of the electrical device main body 201.

Embodiment 2

Figure 9A:
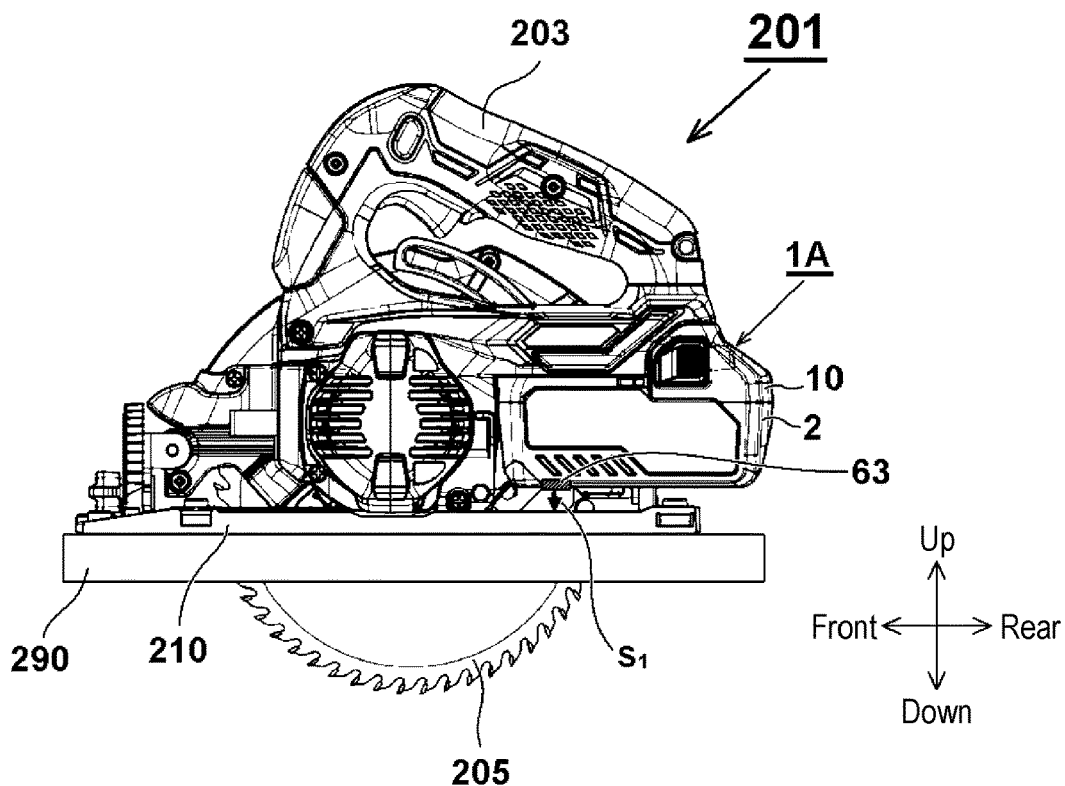
FIG. 9A and FIG. 9B are diagrams for describing a method of controlling an electrical device 201 using a battery pack 1A according to a second embodiment of the present invention (Part 1).
Figure 9B:
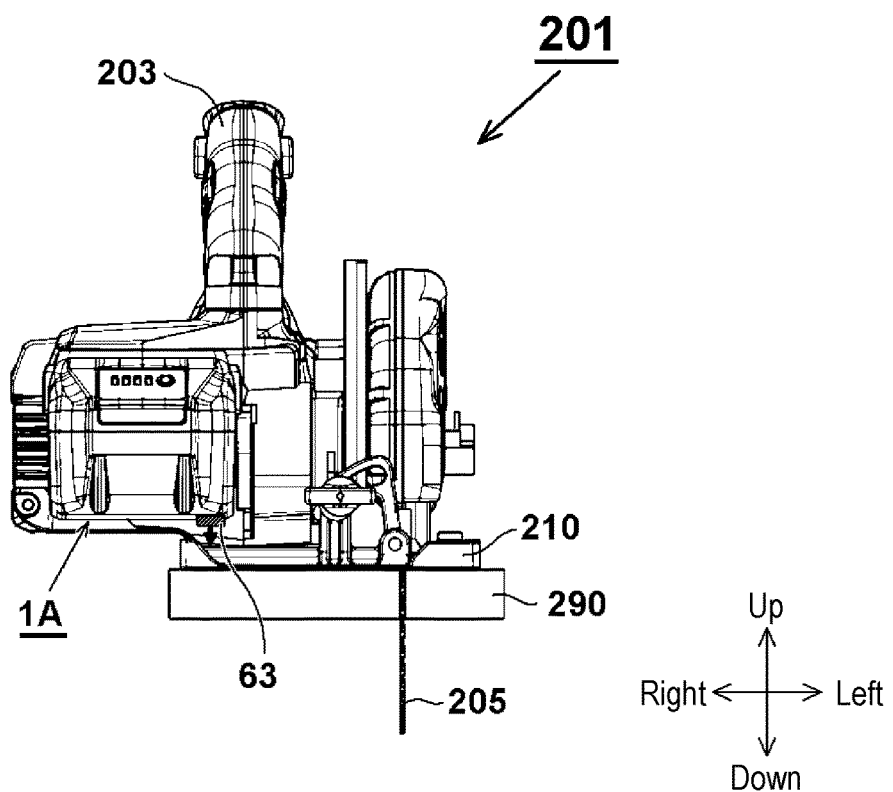

Next, with reference to FIG. 9A and FIG. 9B, a control method of an electrical device main body 201 using a battery pack 1A according to a second embodiment of the present invention will be described. The main body part of the electrical device 201 in FIG. 9A and FIG. 9B is identical to the electrical device main body 201 shown in FIG. 1 and FIG. 6A to FIG. 8C, FIG. 9A is a left side view, and FIG. 9B is a front view. A battery pack 1A to be mounted differs from the battery pack 1 in FIG. 2 in that a distance sensor 63 is additionally provided at the bottom surface of the lower case 2. The distance sensor 63 measures whether an object is present on the lower side from the bottom surface of the lower case 2 based on a distance to the object. In other words, by measuring the distance to the base 210, the distance sensor 63 detects a setting angle of the base 210 and is capable of detecting a cutting depth and an inclination angle of the saw blade 205. The distance sensor 63 corresponds to the "sensor part" of the present invention. The sensor information acquired by the control part 50 is transmitted to the control part 250 of the electrical device main body 201 via the second signal terminals 34 and 234. This sensor information is physical information that changes along with the posture of the electrical device main body 201 (changing due to "external factors" from the perspective of the battery pack 1). With this information, the microcomputer of the control part 250 learns about the distance (herein, the distance to the base 210) between a sensor mounting position and the main body part of the electrical device 201, and optimizes the control in accordance with the cutting depth and the inclination angle. As an example of optimization of the control, since a light-load operation is assumed when the cutting depth is shallow or when there is no inclination, the motor rotational speed may be increased. Conversely, since a heavy-load operation is assumed when the cutting depth is deep or there is a large inclination, the motor rotational speed may be reduced to increase torque. Further, in the case where the electrical device main body 201 is provided with a segment display device or a dot matrix display device (e.g., liquid crystal display), the cutting depth and the inclination angle may be displayed digitally thereon in numerical values.

Figure 10A:
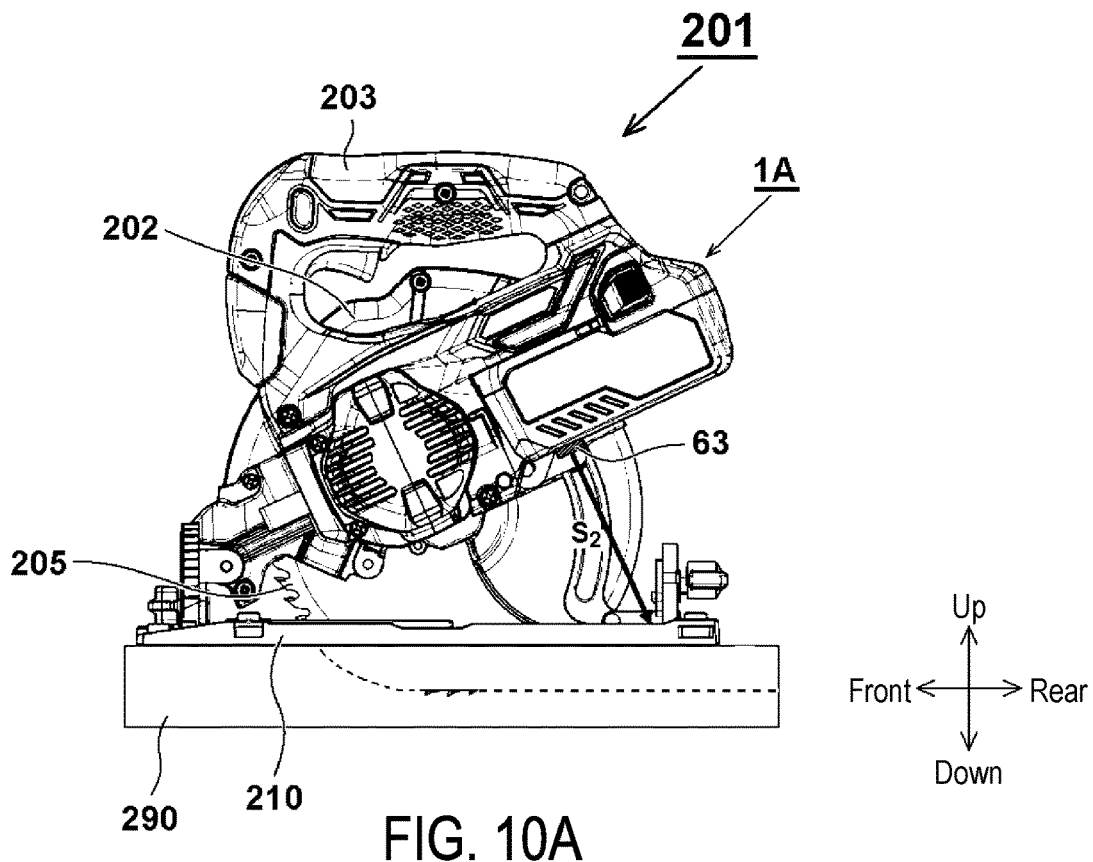
FIG. 10A and FIG. 10B are diagrams for describing a method of controlling the electrical device 201 using the battery pack 1A according to the second embodiment of the present invention (Part 2).
Figure 10B:
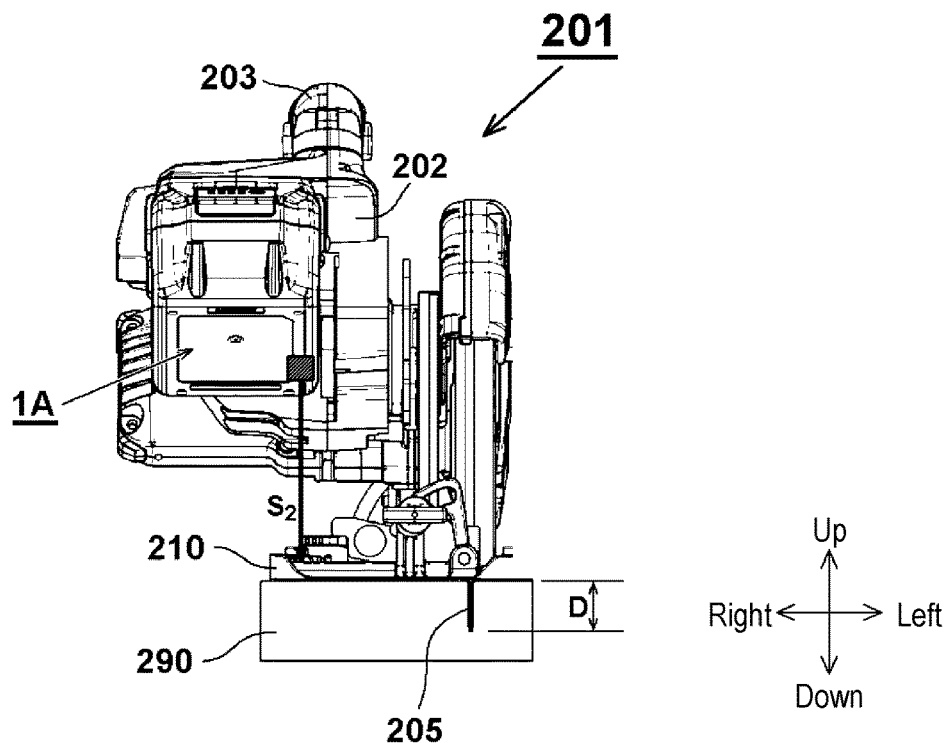

FIG. 9A is a state in which a rear end side of the base 210 is closest to the main housing 202 (battery pack 1) (a position where the cutting depth is maximum), and the distance from the distance sensor 63 to the base 210 at this time is S1. FIG. 10A is a case where the base 210 is fixed such that a rear end part of the base 210 is separated from the main body part (main housing 202). In this case, since the distance from the distance sensor 63 to the base 210 is S2, the control part 250 of the electrical device main body 201, to which the information about the distance S2 is transmitted via the battery pack 1, is capable of determining that a cutting depth D into the cut material (target material) has been set to be shallow.

Embodiment 3

Figure 11A:
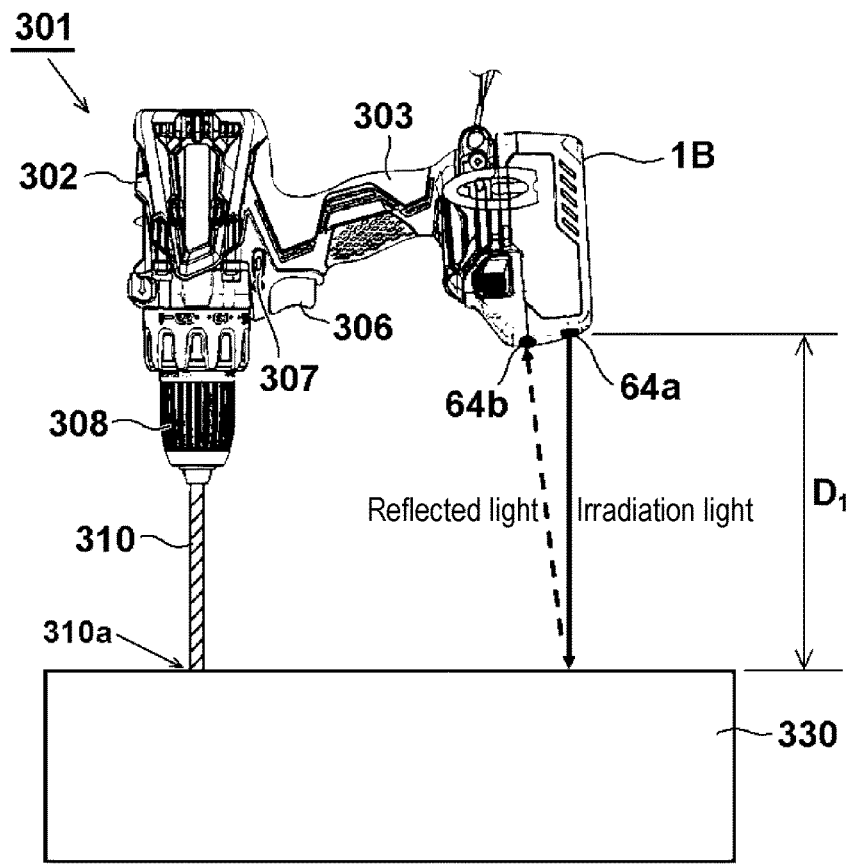
FIG. 11A and FIG. 11B are side views of a battery pack 1B and an electrical device 301 according to a third embodiment of the present invention.
Figure 11B:
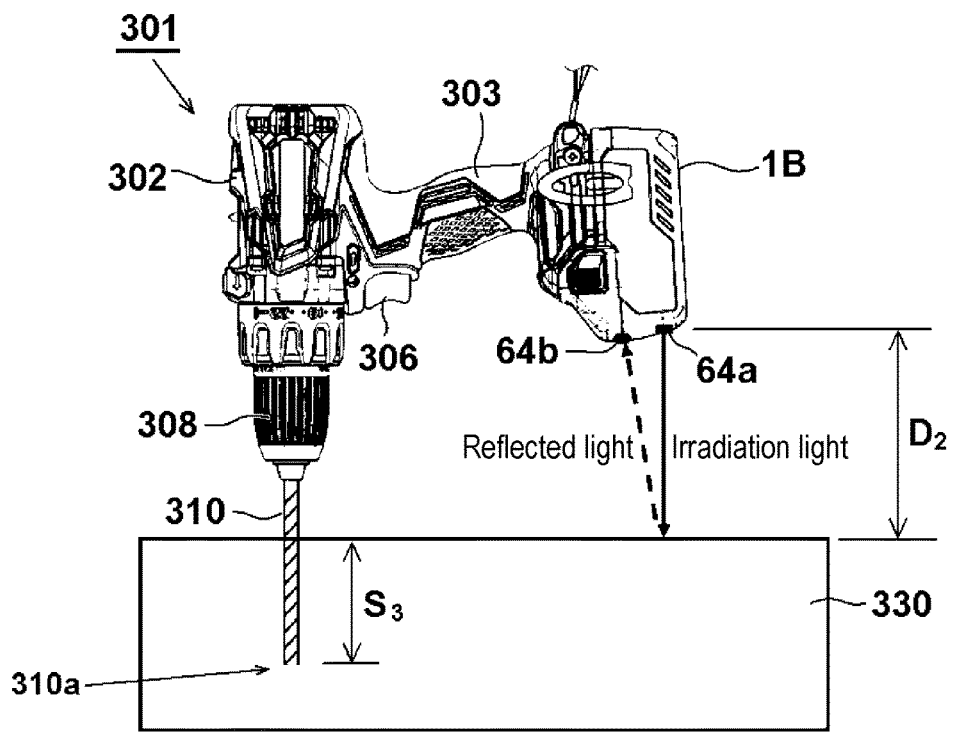

FIG. 11A is a side view of a battery pack 1B and an electrical device main body 301 according to a third embodiment of the present invention and shows a state at the start of a drilling operation. The electrical device main body 301 is shown as an example of a driver drill. In the electrical device main body 301, a brushless direct current motor (not visible in the figure) is accommodated inside a housing 302, and a tip tool 310 is rotated via a power transmission part (not visible in the figure) such as a deceleration mechanism part that decelerates the rotational force of the motor and a clutch mechanism part. The tip tool 310 shown in FIG. 11A and FIG. 11B is a drill bit. To hold the tip tool 310, a chuck (tip tool holding part) 308 is provided at a tip of an output shaft (not visible in the figure).

A handle part 303 is formed to be connected to a portion of the housing 302 that accommodates the motor, and a battery pack 1B is mounted to a distant end part (end part opposite to a motor side) of the handle part 303. A trigger lever 306 is provided at a part of the handle part 303. A forward-reverse switch lever 307 for switching the rotation direction of the motor is provided in the vicinity of the trigger lever 306. The user holds the handle part 303 with one hand, presses a tip part 310a of the tip tool 310 against a target material 330 to position the tip part 310a, and pulls the trigger lever 306 with his or her index finger to adjust a trigger push-in amount (operation amount) and control the rotational speed of the motor (not shown).

The configuration of the battery pack 1B is the same as that of the battery pack 1 in the first embodiment except for the types of the sensors 61 to 69 (see FIG. 3) mounted. Herein, a distance sensor 64 (64a and 64b) is provided at the casing of the battery pack 1B. The distance sensor 64 serves to measure a distance to an object at a separated position in a non-contact manner using light (laser), and is composed of a light emitting part 64a and a light receiving part 64b. The distance sensor 64 corresponds to the "sensor part" of the present invention. This embodiment does not measure the distance from the electrical device main body 301 to the target material (drilled material) 330, but measures the distance from the battery pack 1B to the target material (drilled material) 330. This distance is physical information that changes along with the posture of the electrical device main body 301 (changing due to "external factors" from the perspective of the battery pack 1). The irradiation light irradiated from the light emitting part 64a of the battery pack 1B is reflected by the target material 330 such as wood and returns to the battery pack 1 side, and is thus received by the light receiving part 64b. The control part 50 of the battery pack 1B analyzes and calculates the reflected light and calculates a distance $D_1$ from the light emitting part 64a to the target material 330 and outputs the distance $D_1$ to the control part 250 of the electrical device main body 301. By using such a distance sensor 64, it is possible to detect a hole depth $S_3$ and automatically stop at any depth. In other words, at a time point at which the distance to the target material 330 at the start of the drilling operation has decreased by a set hole depth $S_3$ ($D_2=D_1-S_3$), the control part 50 on the battery pack 1 side transmits a stop signal to the control part 250 on the electrical device main body 301 side via the third signal terminals 38 and 238.

When performing the control of the third embodiment, the hole depth $S_3$ is set and stored in the microcomputer of the control part 50 on the battery pack 1 side before each drilling operation, and the setting method may be performed in any manner. For example, an input part for setting a drilling depth and a set display part are provided in advance at the input part of the electrical device main body 301, the operator sets the drilling depth (e.g., $S_3=30$ mm) before drilling, and the operator positions the tip part 310a of the tip tool 310 at a drilling spot of the target material 330 as shown in FIG. 11A. Thus, when the operator pulls the trigger lever 306 to start the motor, the control part 250 of the electrical device main body 301 notifies the control part 50 on the battery pack 1B side of the start of operation. This notification is performed via the first signal terminals 36 and 236 (see FIG. 3). The control part 50 on the battery pack 1B side measures the distance $D_2$ to the target material and stores the distance $D_2$ to a temporary storage device. The control part 50 continuously monitors the distance to the target material during the drilling operation, and when the distance $D_2$ becomes "distance $D_1$-drilling depth $S_3$", the control part 50 transmits a stop signal to the control part 250 on the electrical device main body 301 side via the third signal terminals 38 and 238.

Figure 12A:
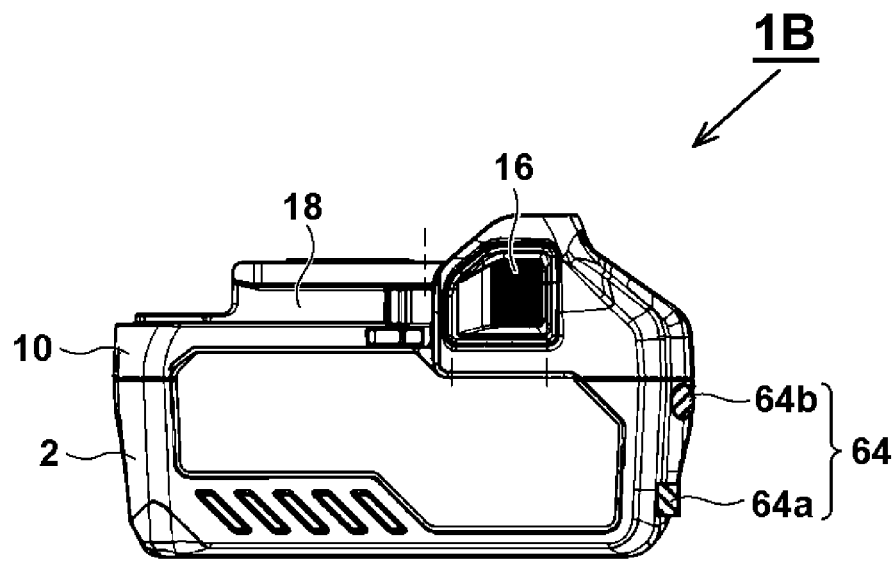
FIG. 12A and FIG. 12B are diagrams showing the battery pack 1B shown in FIG. 11A and FIG. 11B.
Figure 12B:
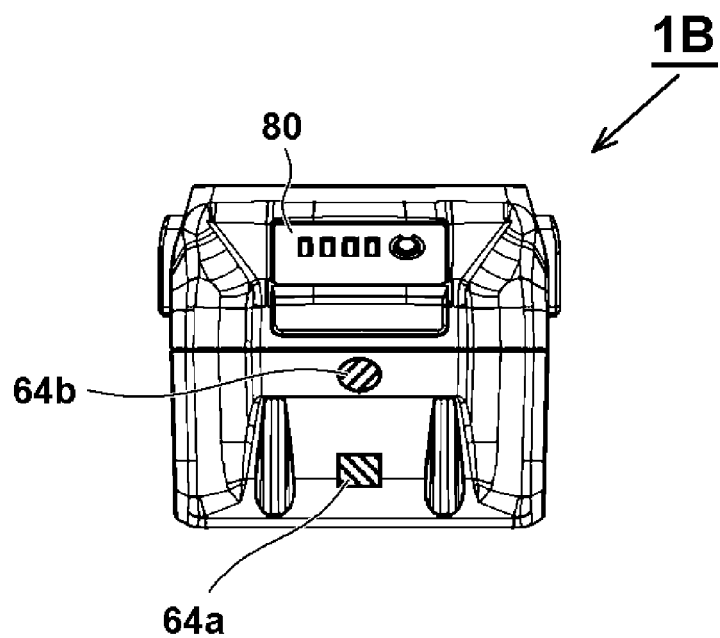

FIG. 12A and FIG. 12B are diagrams showing the battery pack 1B shown in FIG. 11A and FIG. 11B, FIG. 12A is a left side view, and FIG. 12B is a rear view. The battery pack 1B is provided with the distance sensor 64 (the light emitting part 64a, the light receiving part 64b, and a distance measuring part (not shown)) as one of the sensors 61 to 69. The distance sensor 64 is provided in the vicinity of a left-right center at the lower case 2.

As described above, by changing from a conventional battery pack without a sensor to the battery pack 1B according to this embodiment, it becomes possible to perform a drilling operation at an accurate depth on the target material 330. Although the above example illustrates a drilling operation, it may also be applied to the case where the tip tool 310 is a driver bit. In other words, in the case of performing screw tightening, by automatically stopping the motor when the position of the screw head reaches a position in line with the surface of the target material 330 in accordance with the length of the screw, it becomes possible to accurately tighten the screw to the surface of the target material 330. Although an example of a distance sensor using light has been illustrated in the third embodiment, it may also be applied to other forms of distance sensors, for example, a distance sensor using ultrasonic waves, or other distance sensors.

Embodiment 4

Figure 13A:
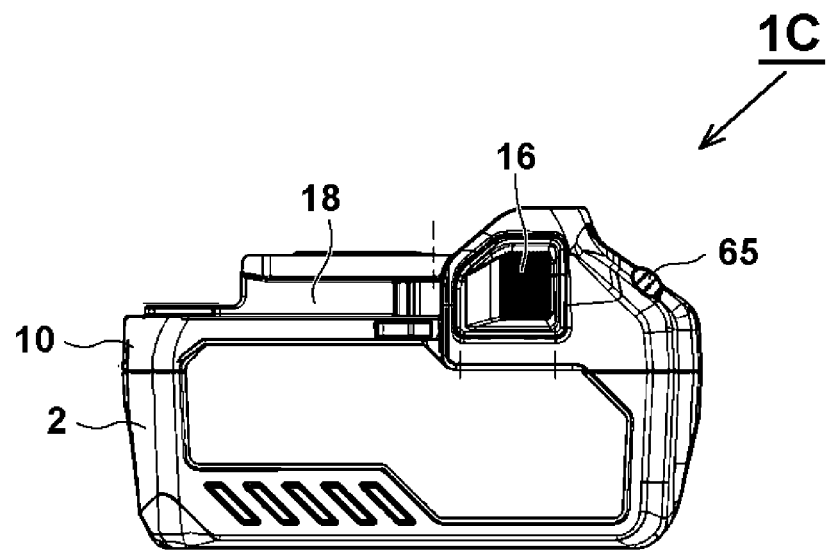
FIG. 13A and FIG. 13B are diagrams showing a battery pack 1C according to a fourth embodiment of the present invention.
Figure 13B:
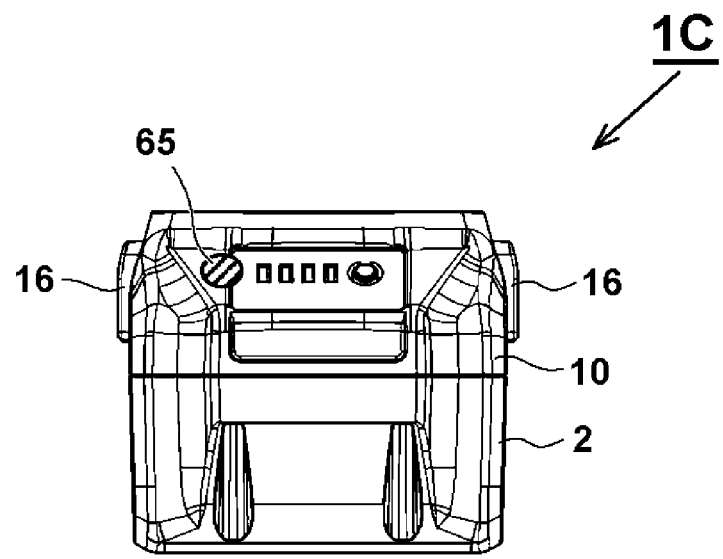

FIG. 13A and FIG. 13B are diagrams showing a battery pack 1C according to a fourth embodiment of the present invention, FIG. 13A is a left side view, and FIG. 13B is a rear view. Herein, a human detecting sensor 65 is provided as one of the sensors 61 to 69. The human detecting sensor 65 is used for operating the electrical device main body 301 or the like by detecting temperature changes in the surrounding using an infrared sensor. The human detecting sensor 65 corresponds to the "sensor part" of the present invention. In the fourth embodiment, the human detecting sensor 65 is provided on the left side of a display part 80 of the upper case. By providing the human detecting sensor 65 at this position, it is possible to detect whether the operator has grasped the handle part 303 of the electrical device main body 301. The detection value of the human detecting sensor 65 does not arise due to the battery pack 1 but is physical information that changes due to an external factor which is the operator. With detection performed by the human detecting sensor 65, upon detecting that the electrical device main body 301 has been grasped, the control part 50 of the battery pack 1C may perform control to start up the control part 250 on the electrical device main body 301 side. This sensor information is physical information that changes along with the posture of the electrical device main body 301 (changing due to "external factors" from the perspective of the battery pack 1). To enable this control, it is necessary to provide a startup circuit on the electrical device main body 301 side to start up the control part 250 when a startup instruction signal is transmitted to the electrical device main body 301 side via the second signal terminals 34 and 234.

As in the embodiment of the fourth embodiment, it is also possible to provide a sensor other than the human detecting sensor in an internal region or in the vicinity of the display part 80 of the battery pack 1C. For example, although not shown, as the sensor part, instead of, or in addition to, the human detecting sensor 65, a fingerprint sensor is provided, and with the operator touching the fingerprint sensor (not shown) of the battery pack 1C to perform fingerprint authentication before start of an operation, the control part 50 of the battery pack 1C may perform control to start up the control part 250 on the electrical device main body 301 side.

Embodiment 5

Figure 14A:
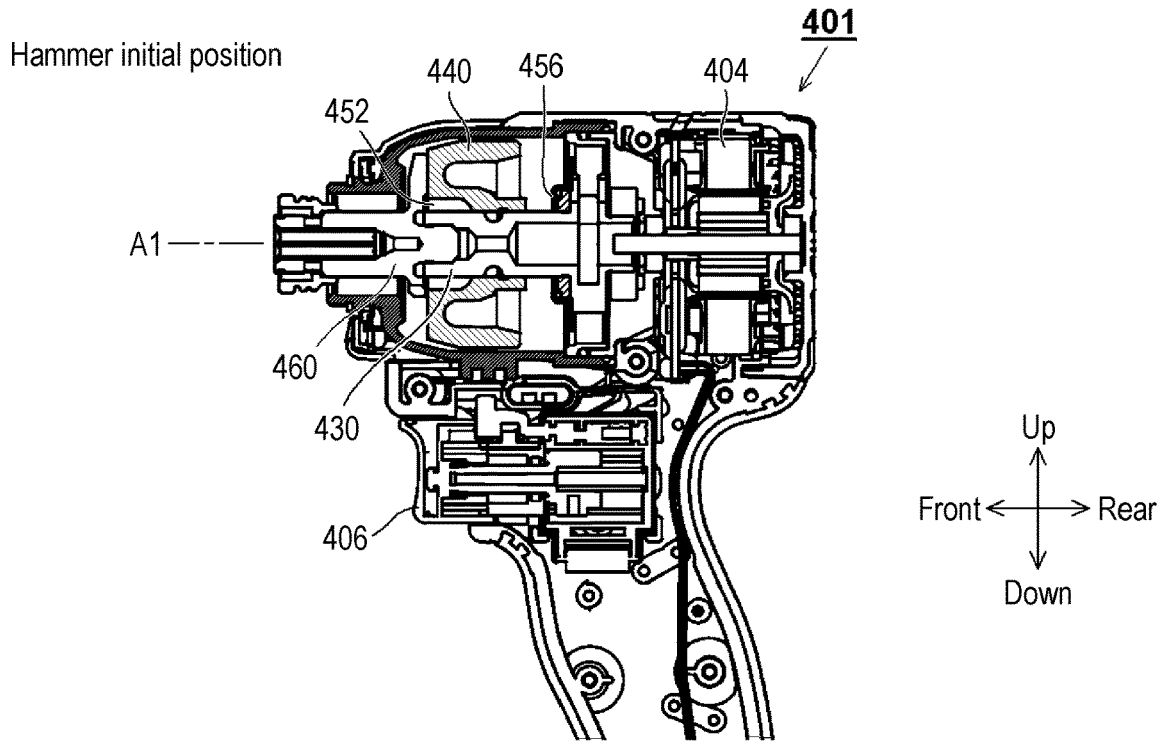
FIG. 14A and FIG. 14B are longitudinal sectional views for describing a state of controlling an electrical device main body 401 according to a fifth embodiment of the present invention.
Figure 14B:
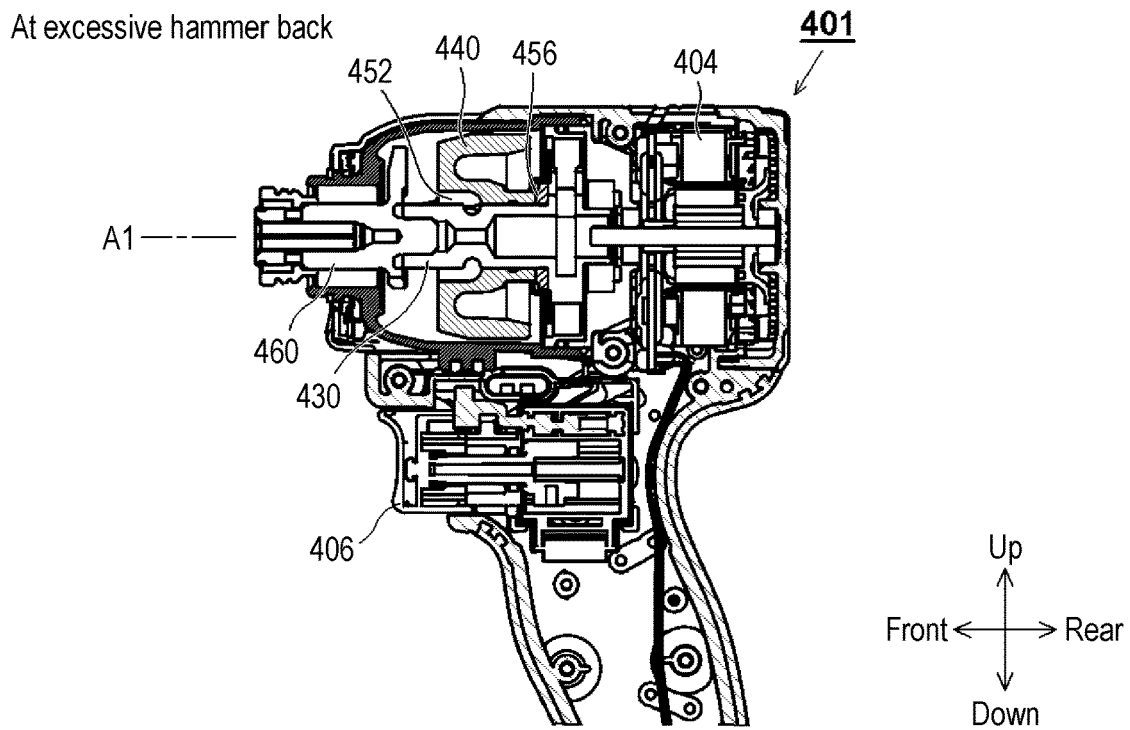

FIG. 14A and FIG. 14B illustrate an electrical device main body 401 according to a fifth embodiment of the present invention. FIG. 14A and FIG. 14B are longitudinal sectional views of the electrical device main body 401 controlled using the battery pack 1 having the sensors 61 to 69, FIG. 14A shows a state in which a hammer is at an initial position (forward position), and FIG. 14B shows a state in which the hammer collides with a cam end and vibrations different from those at the time of a normal striking operation occur throughout the device. Herein, although illustration of the battery pack 1 is omitted, a battery pack attached with an acceleration sensor 61 as in the first embodiment is used as the battery pack 1. The acceleration sensor 61 corresponds to the "sensor part" of the present invention.

The hammer 440 is constantly urged forward by a hammer spring (not shown), and when stationary, the hammer 440 is at a forward position by a cam mechanism using a cam ball (not shown) and a cam groove 452. This position is where a striking claw of the hammer 440 overlaps with a struck claw of an anvil 460 in an axis A1 direction. Upon rotational driving of a spindle 430, this rotation is transmitted to the hammer 440 via the cam mechanism, and the striking claw of the hammer 440 engages with the struck claw of the anvil 460. For a while from the start of tightening of the electrical device main body 401, the hammer 440 and the anvil 460 rotate synchronously (continuous rotation). Afterwards, as the tightening progresses, a reverse torque transmitted from the tip tool gradually increases, and when this reverse torque exceeds a spring pressure of the hammer spring, the hammer 440 gradually retreats to the rear side (motor 404 side) while compressing the hammer spring (not shown). Generally, with this retreat, the rear end of the hammer 440 does not reach a stopper position, but in cases such as receiving a strong reaction force from the tip tool, the hammer 440 moves more greatly than usual, and an inner rear end of the hammer 440 may collide with a stopper 456.

If the hammer 440 moves back excessively, a large acceleration in the horizontal direction (X direction and Y direction) is detected by the acceleration sensor 61 mounted to the battery pack 1. This acceleration does not occur due to internal factors of the battery pack 1, but is physical information generated due to external factors arising from an operation of outside (electrical device main body 401) of the battery pack 1. The control part 50 of the battery pack 1 acquires the acceleration detected by the acceleration sensor 61, and in the case of detecting a large vibration exceeding a threshold, the control part 50 immediately stops the motor 404 of the electrical device main body 401, or continues the operation with the output of the motor 404 greatly reduced until a trigger lever 406 is released. In this manner, the acceleration sensor 61 on the battery pack 1 side detects abnormal vibrations, and the control part 50 on the battery pack 1 side determines whether it is necessary to change the control on the electrical device main body 401 according to the detection result, and transmits the determination result to the control part 250 of the electrical device main body 401 via the third signal terminals 38 and 238. Upon receiving this communication information, the control part 250 of the electrical device main body 401 performs necessary control, for example, performing control of immediately stopping the motor 404 or reducing the output of the motor 404 by a certain amount (e.g., by 40%).

As described above, in the fifth embodiment, in a device such as an impact tool and a hammer drill that is prone to vibration, it is possible to perform control to stop the output of the motor or control to reduce the output of the motor by a certain amount using the output of the acceleration sensor 61 on the battery pack 1 side.

Embodiment 6

The present invention may be further implemented in another embodiment (sixth embodiment). In the sixth embodiment, a "position sensor" is provided as the sensor part provided at the battery pack, and by identifying the position (location) of the battery pack, the position of the electrical device connected thereto is detected. Herein, a global positioning system (GPS) sensor is provided at the circuit board 45 (see FIG. 2) of a battery pack 1E (not shown) as the position sensor. This GPS sensor is configured to three-dimensionally locate the position of a radio receiver on Earth based on arrival times of radio waves of time signals emitted from multiple satellites. When using this GPS sensor, the control part (microcomputer) of the battery pack 1E determines whether the battery pack 1E is mounted to the electrical device main body, and when the battery pack 1E is mounted to the electrical device main body or when the battery pack 1E is mounted to the electrical device main body and the microcomputer of the electrical device main body has started up, the battery pack 1E is capable of detecting the location information.

Once the position of the electrical device main body to which the battery pack 1E (not shown) is mounted can be detected, it is possible to set the operation permission range (region) of the electrical device main body. For example, by registering the location information of a planned operation site, the operation of the electrical device main body is permitted within the planned operation site, and if it is determined by the microcomputer of the battery pack 1E that it is outside the planned operation site, the operation of the electrical device main body may be controlled to stop (e.g., stopping the motor). For this control, information about the operation permission range is registered in advance in the storage device of the electrical device main body. When the battery pack 1E is mounted to the electrical device main body, the microcomputer of the battery pack 1E acquires the information about the operation permission range from the microcomputer of the electrical device main body and performs control using this information.

With the "position sensor" provided at the battery pack, other usage methods may also be considered. For example, in a state in which the battery pack 1E is mounted to the electrical device main body and the microcomputer of the electrical device main body has started up, the control part (microcomputer) of the electrical device main body (not shown) may store its position (location) to the storage device to record the operation location of the electrical device main body together with time.

Embodiment 7

In a seventh embodiment, a "sound sensor" is provided as the sensor part provided at a battery pack 1F (not shown), and by detecting sound (physical information due to external factors) arriving from outside the battery pack, the operation of the electrical device main body connected to the battery pack is controlled. The sound sensor is one (first sensor) of sensors for collecting sound (sound waves) arriving from outside the battery pack 1F and, for example, detects the magnitude of compression waves transmitted through air (medium). As the sound sensor, it is preferable to use any of an electrodynamic type, electrostatic type, and piezoelectric type microphone in one to four directions viewed on a horizontal plane of the battery pack. For example, by monitoring the output of the sound sensor, it becomes possible for the control part (microcomputer) of the battery pack 1F to perform control to stop the motor if the surrounding sound (noise) increases during operation or standby of the electrical device main body. Furthermore, by monitoring the output of the sound sensor, the microcomputer of the battery pack 1F detects sound (operation sound) emitted from the electrical device main body, determines whether a bolt has been tightened, and is capable of performing control of stopping the motor.

Embodiment 8

In an eighth embodiment, an "image sensor (e.g., camera)" is provided as the sensor part provided at a battery pack 1G (not shown), and by acquiring images (physical information due to external factors) of outside the battery pack, the battery pack uses image information to assist in the control of the electrical device main body. For example, the control part (microcomputer) of the battery pack acquires surrounding image information and, using known image recognition technology, may perform control of stopping the motor of the electrical device main body if a person's hand enters an operation target area (a range that a hand normally should not be brought close to) of a circular saw or the like.

Embodiment 9

In a ninth embodiment, an "illuminance sensor" is provided as the sensor part provided at a battery pack 1H (not shown), and by acquiring information on brightness outside the battery pack (e.g., illuminance, physical information due to external factors), the battery pack uses illuminance image information to assist in the control of the electrical device main body. For example, using the illuminance sensor provided at the battery pack 1H, it is possible to monitor the brightness of the surroundings and adjust the brightness of the electrical device main body such as a light and the brightness (e.g., illuminance of backlight of a liquid crystal display) of the display device of the electrical device main body according to the brightness of the site. Further, it is also possible to perform control such that, upon covering the illuminance sensor portion provided at the battery pack 1H (not shown) with a hand, the setting such as rotational speed on the electrical device main body side is changed.

Embodiment 10

Embodiment 10 is a control method of an electrical device main body 501 having a shape in which the battery pack 1 is slid with respect to the electrical device main body 501 in the up-down direction (Y-axis direction, vertical direction) to be attached and detached, and will be described with reference to FIG. 15A to FIG. 17C. An example of a circular saw main body is shown as the electrical device main body 501, and the electrical device main body 501 corresponds to the electrical device main body 201 shown in FIG. 5. Except that the mounting direction of the battery pack 1 is different, the configuration of other portions is identical to that of the electrical device main body 201.

Figure 15A:
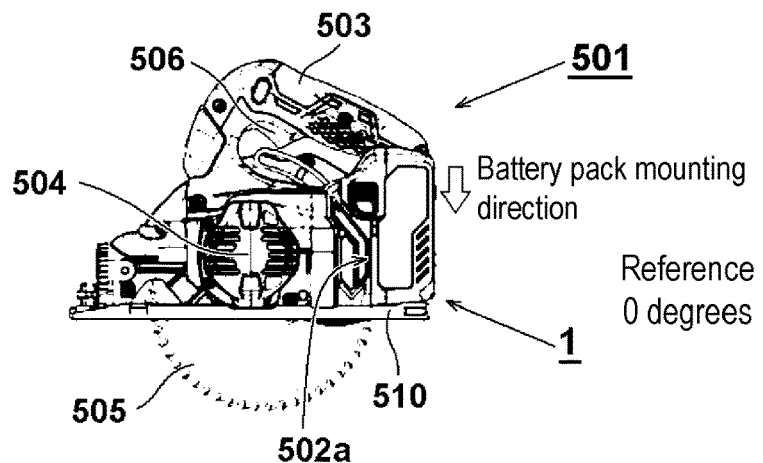
FIG. 15A to FIG. 15C are diagrams for describing a method of controlling an electrical device 501 according to a tenth embodiment using the battery pack 1 according to the first embodiment of the present invention (Part 1).
Figure 15B:
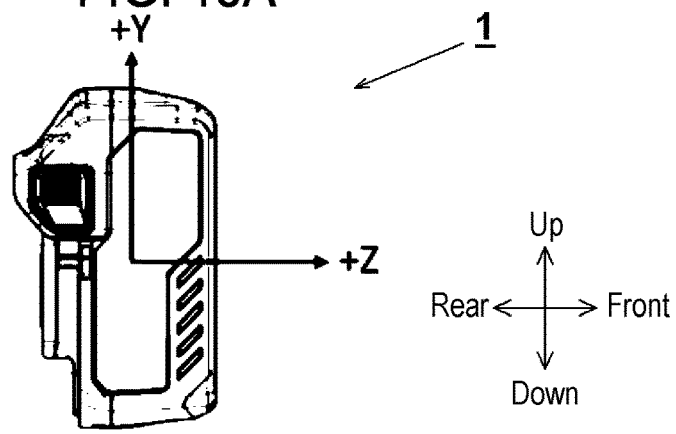
Figure 15C:
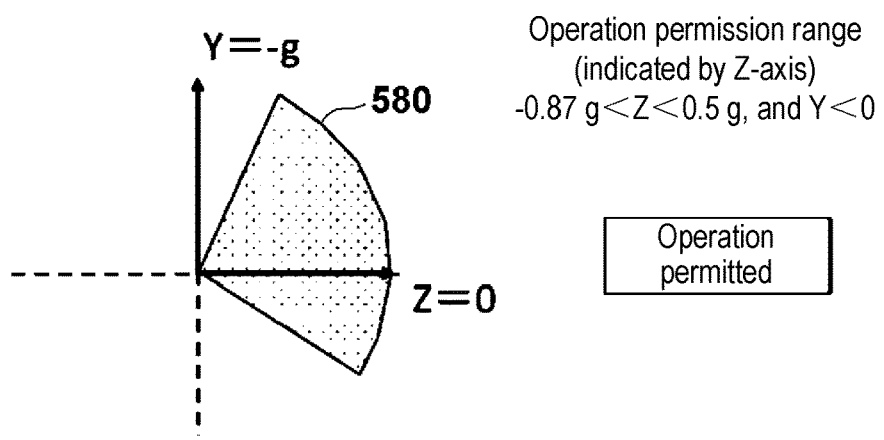

The main body part (circular saw main body) of the electrical device 501 shown in FIG. 15A to FIG. 15C indicates the case where the posture is in the horizontal state, and is a state in which the angle formed by a base 510 with respect to the horizontal plane is 0 degrees. FIG. 15A is a left side view of the circular saw (electrical device 501), and FIG. 15B is the posture of the battery pack 1 when the electrical device 501 is in the state of FIG. 15A (reference 0 degrees). The battery pack 1 may be mounted to a battery pack mounting part 502a by moving relatively downward from above with respect to the electrical device main body 501. For example, when positioned in the horizontal state at the electrical device main body 501 in the state as in FIG. 15A, the Y-axis direction of the battery pack 1 is in a vertical state. When a cutting operation is performed with the circular saw with the battery pack 1 in the vertical state, in the output of the acceleration sensor 61 (see FIG. 2) of the battery pack 1, Y, which is a gravitational component in the +Y direction, is detected as −1 g (g is gravitational acceleration, and 1 g=9.80665 m/s$^2$). Further, upon tilting of the battery pack 1, the Z-direction component changes, so it is possible to detect the tilt of the battery pack 1 by the acceleration sensor 61. The electrical device main body 501 includes a base 510 that is placed and slides on the cut object, a saw blade 505 that protrudes from an opening provided at the base 510 to the lower surface of the base, a motor 504 that rotates the saw blade, and a handle part 503 that is provided at an upper part of a housing accommodating the motor 504. A trigger lever 506 for turning on rotation of the motor 504 is provided at the handle part 503. The configuration of the electrical device main body 501 is similar to that of the electrical device main body 201 shown in FIG. 1.

In the case where the reference direction of the Z-axis of the acceleration sensor 61 mounted to the battery pack 1, which changes together with the operating posture of the electrical device main body 501, is within an operation permission range 580 (shown by diagonal lines) shown in FIG. 15C, the control part 50 of the battery pack 1 permits the operation of the electrical device main body 501, that is, executing the procedure of step 139 in FIG. 5. Herein, whether it is within the "operation permission range 580" may be determined according to the Y component and the Z component in the output of the acceleration sensor 61 provided at the battery pack 1, and it is determined to be "operable" in the case where −0.87 g<Z<0.5 g and Y<0. The state of FIG. 15A to FIG. 15C (reference 0 degrees) corresponds to the threshold B of step 134 in FIG. 5. In FIG. 15C, the horizontal axis dotted line is an absolute Z-axis direction (one direction passing through a horizontal plane), and the vertical axis dotted line is an absolute Y-axis direction (one direction passing through an extending plane). In the posture of the electrical device main body 501 in FIG. 15A, due to gravitational acceleration, Y=−1 g and Z=0, which falls within the operation permission range of the determination condition described above, so the operator may continue the operation with the electrical device main body 501 thereafter. Within a range in which the cutting depth can be adjusted, the electrical device main body 501 is in a state within the operation permission range and is capable of performing the cutting operation.

Figure 16A:
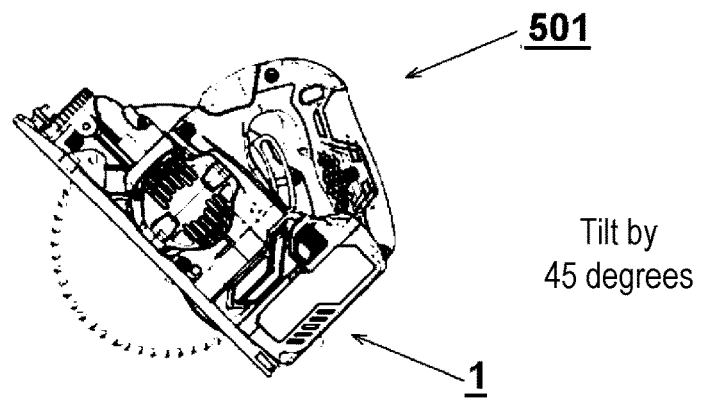
FIG. 16A to FIG. 16C are diagrams for describing a method of controlling the electrical device 501 according to the tenth embodiment using the battery pack 1 according to the first embodiment of the present invention (Part 2).
Figure 16B:
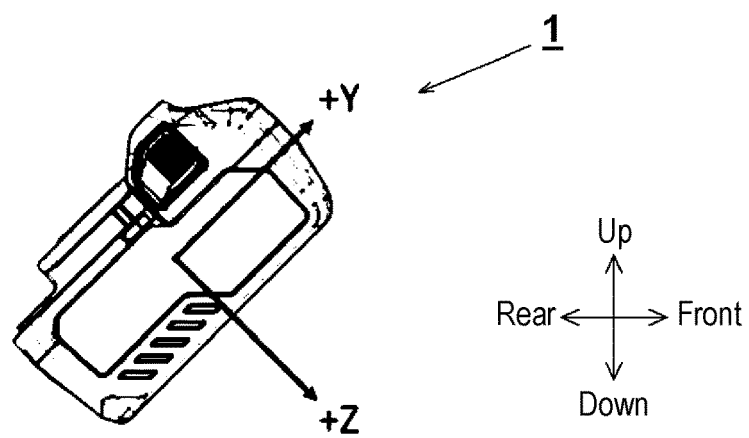
Figure 16C:
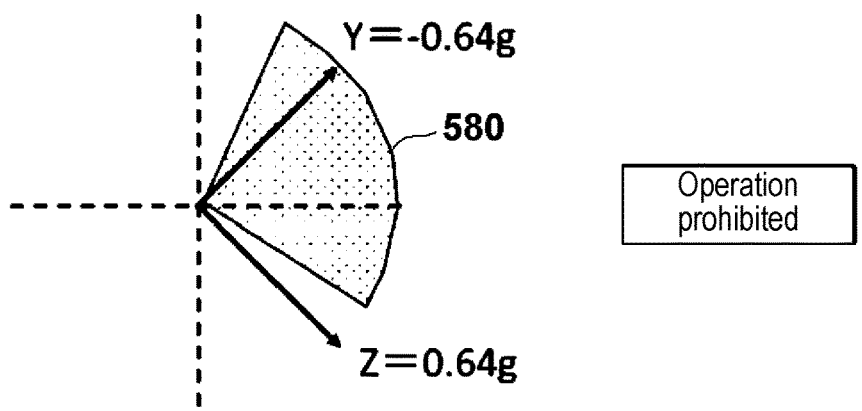

FIG. 16A to FIG. 16C are a state in which the posture on the front side of the main body part of the electrical device 501 is tilted upward by about 45 degrees from the state in FIG. 15A, FIG. 16A is a left side view of the circular saw (electrical device main body 501), and FIG. 16B is the posture of the battery pack 1 when in the state of FIG. 16A. As is clearly seen compared to the state in FIG. 15A to FIG. 15C, since the battery pack 1 in the case of this posture is in the posture shown in FIG. 16B together with the electrical device main body 501, due to influence of gravitational acceleration, the detection values in the Y-axis direction and the Z-axis direction of the acceleration sensor 61 become −0.64 g in the Y-axis direction and 0.64 g in the Z-axis direction as shown in FIG. 16C. This falls outside the determination condition, that is, outside the operation permission range 580, so the control part 50 of the battery pack 1 determines that the operation of the electrical device main body 501 should be prohibited (corresponding to step 137 in FIG. 5), and sends out an output stop signal to the electrical device main body 501 (see step 138 in FIG. 5).

Figure 17A:
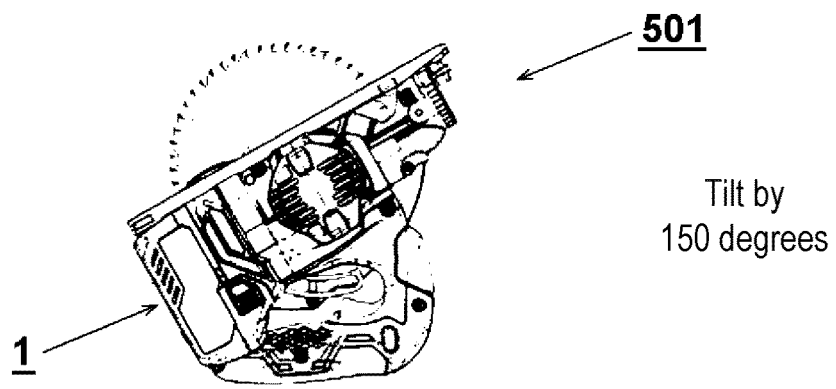
FIG. 17A to FIG. 17C are diagrams for describing a method of controlling the electrical device 501 according to the tenth embodiment using the battery pack 1 according to the first embodiment of the present invention (Part 3).
Figure 17B:
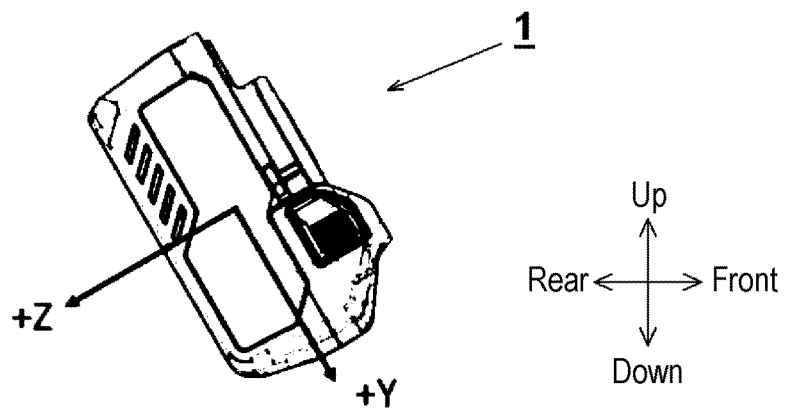
Figure 17C:
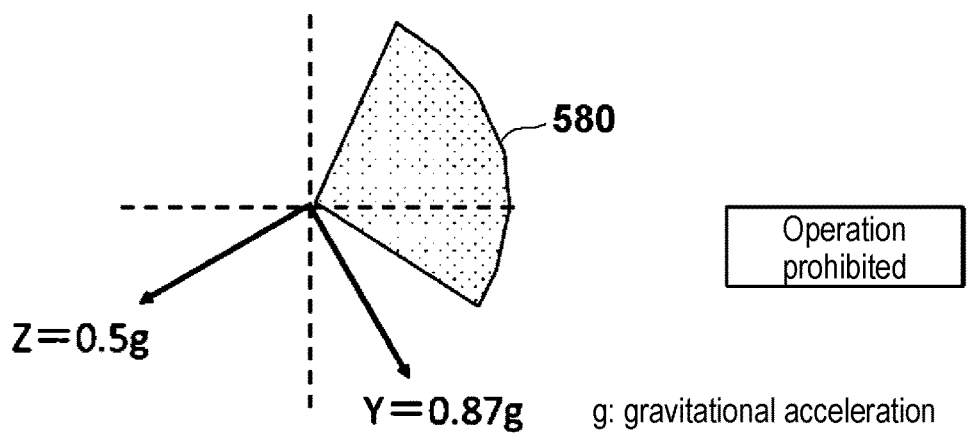

FIG. 17A to FIG. 17C are a state in which the posture of the main body part of the electrical device 501 has inverted and rotated by about 150 degrees from the state in FIG. 15A. This state corresponds to an operation state in which the operator uses the circular saw (electrical device main body 501) to cut branches of trees or cut wood on the ceiling from below. FIG. 17A is a left side view of the circular saw (electrical device main body 501), and FIG. 17B is the posture of the battery pack 1 when in the state of FIG. 17A. In the battery pack 1 in the case of the posture of FIG. 17A, due to influence of gravitational acceleration, the detection values of the acceleration sensor 61 become 0.87 g in the Y-axis direction and 0.5 g in the Z-axis direction. The detection value in the Y-axis direction becomes a positive value because the sensor 61 is turned upside down. Since this falls outside the determination condition described above, that is, outside the operation permission range 580, the control part 50 of the battery pack 1 determines that the operation of the electrical device main body 501 should be prohibited (corresponding to step 137 in FIG. 5), and sends out an output stop signal to the electrical device main body 501 (see step 138 in FIG. 5).

As described above, even with the circular saw B (electrical device main body 501) of a configuration in which the battery pack 1 is attached and detached in the up-down direction with respect to the circular saw main body, similar to the circular saw A (electrical device main body 201) in FIG. 6A to FIG. 8C, the control part 50 of the battery pack 1 is capable of setting the threshold (operation permission range) to perform posture determination based on the mounting direction of the battery pack 1, and determining whether the operation is possible. Thus, using the battery pack 1 attached with the sensor, it is possible to effectively prohibit an operation that operates the circular saw B (electrical device main body 501) in an inappropriate posture. Although it has been described that the battery pack 1 is attached and detached in the front-rear direction (horizontal direction) with respect to the circular saw main body in FIG. 6A to FIG. 8C, and the battery pack 1 is attached and detached in the up-down direction (vertical direction) with respect to the circular saw main body in FIG. 15A to FIG. 17C, the direction of mounting the battery pack 1 to the circular saw main body (electrical device main bodies 201 and 501) may be set in any manner. For example, in the case of a configuration of attaching and detaching in the left-right direction, a configuration of attaching and detaching in a diagonal direction, or a configuration of connecting a plurality of battery packs 1 at the same time, whether the plurality of battery packs 1 have the same attaching/detaching direction or different attaching/detaching directions from each other, the control part 50 of the battery pack 1 is capable of performing posture determination based on the device main body information of the electrical device main bodies 201 and 501 and the sensor information. In other words, the electrical device main bodies 201 and 501 transmit their own device main body information including the attaching/detaching direction and quantity of the battery packs 1 to the control part 50 of the battery pack 1. The control part 50 may determine the posture of the electrical device main bodies 201 and 501 based on the posture information detected by the sensor and the information of the attaching/detaching direction of the battery pack 1 to control the electrical device main bodies 201 and 501 according to the result thereof.

Embodiment 11

Next, a circuit diagram of battery packs and an electrical device main body 201A in a configuration capable of connecting a plurality of battery packs 1 to the electrical device main body 501 at the same time will be described with reference to FIG. 18. At a main housing 202 of the electrical device main body (e.g., circular saw C) 201A, a plurality (herein, two) of battery pack mounting parts are provided, and terminals equivalent to the positive electrode input terminal 232, the negative electrode input terminal 237, and the first to third signal terminals 234, 236, and 238 in FIG. 3 are provided in a plurality of sets in accordance with the quantity (herein, two) of the battery packs 1 capable of being attached. In the circuit diagram of FIG. 18, only one set of the positive electrode input terminal 232 and the negative electrode input terminal 237 is shown, but this means that the plurality of battery packs are connected in parallel with each other, and actually, a plurality of sets (two sets) are provided. Further, battery communication circuits 260a and 260b corresponding to each battery pack 1 are provided respectively. There is only one control signal input circuit 261, and control signals from the plurality of battery packs 1 are inputted to the control signal input circuit 261. A second battery pack (2) has the same configuration as the first battery pack (1), and the rest of the circuit configuration on the electrical device main body 201A side is the same as that of the electrical device main body 201 in FIG. 3 and is labeled with the same reference signs. Wireless communication may be performed between the two battery packs (1) and (2), and one battery pack (1) may collect information from the other battery pack (2) and communicate with the electrical device main body 201A on its behalf. In that case, it is not necessary to provide two battery communication circuits such as the battery communication circuits 260a and 260b, and one would be sufficient.

Figure 18:
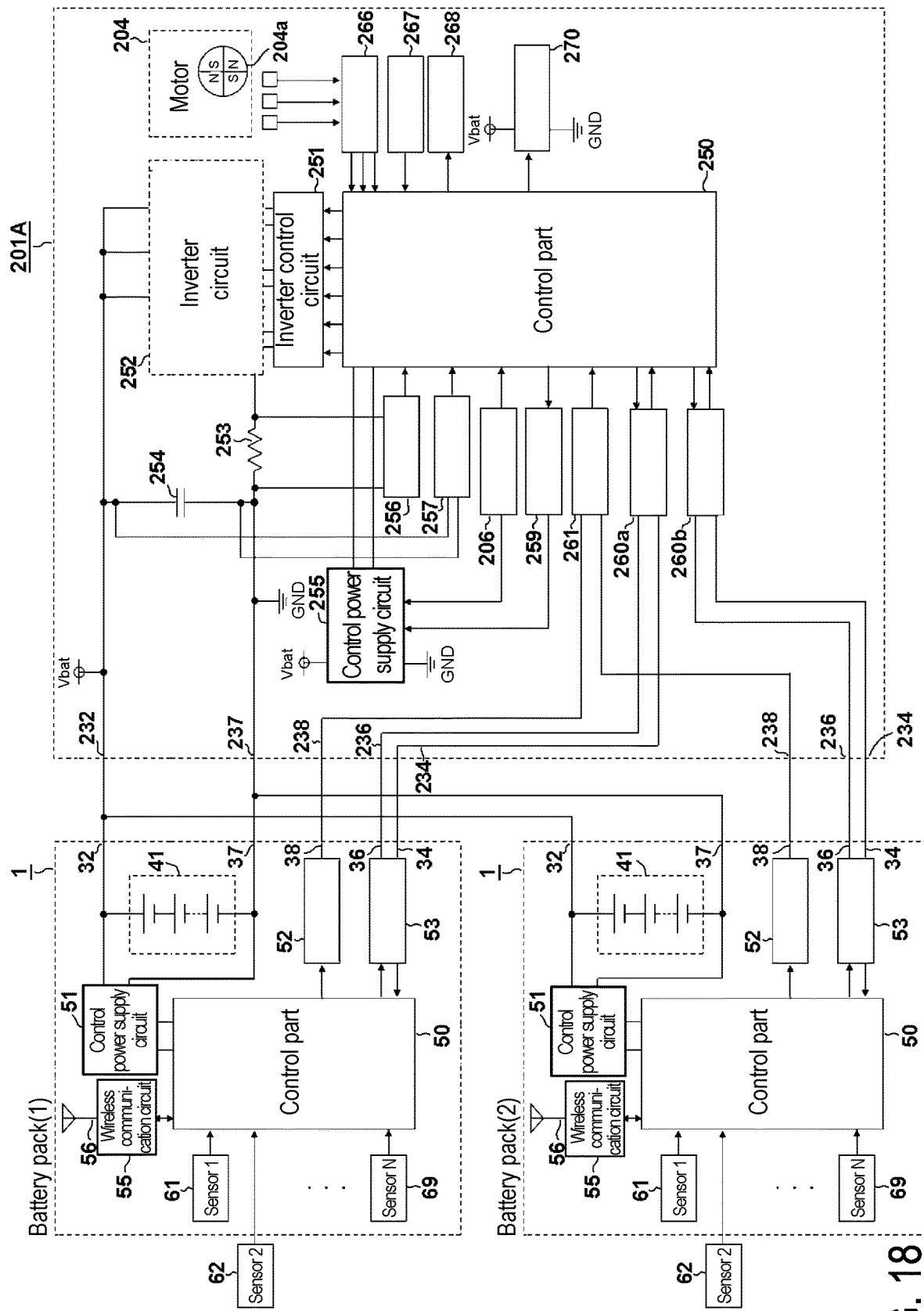
FIG. 18 is a circuit diagram of the battery pack 1 of the first embodiment of the present invention and an electrical device 201A according to an eleventh embodiment.
Figure 19:
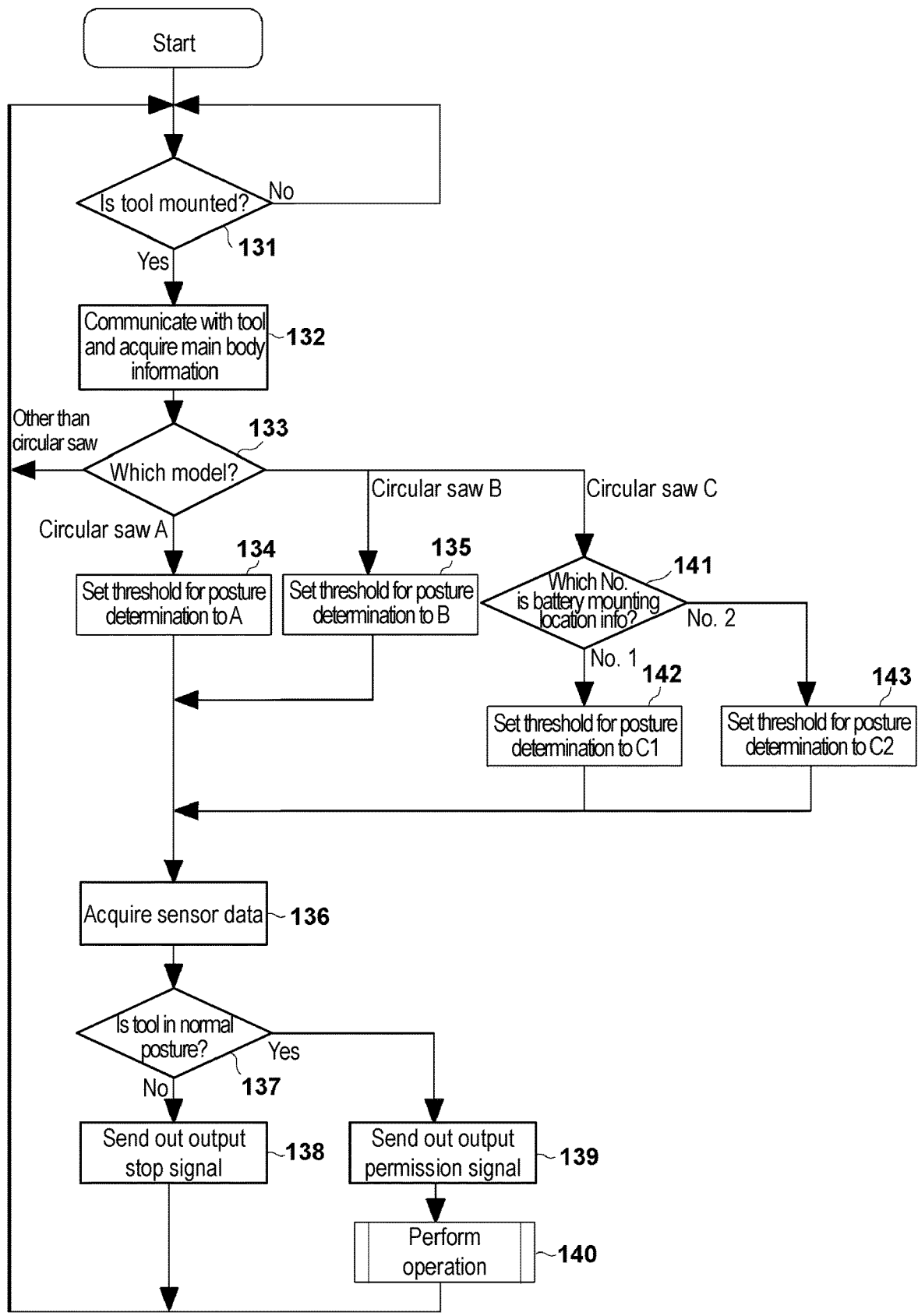
FIG. 19 is a flowchart showing a control procedure of the control part 50 of the battery pack 1 in the case of adding the electrical device main body 201A (circular saw C) according to the eleventh embodiment of the present invention to the flowchart of FIG. 5.

FIG. 19 is a flowchart showing a control procedure of the battery pack 1 in the case where the electrical device main body 201A (circular saw C) shown in FIG. 18 is added to the determination element at step 133 in the flowchart of FIG. 5. The control from steps 131 to 140 is the same as the procedure shown in FIG. 5. In step 133, the control part 50 of the battery pack 1 determines which model the mounted electrical device main body 201 is using the received device main body information. Herein, in the case where the electrical device main body 201 is the first circular saw (circular saw A) and the second circular saw (circular saw B), similar to FIG. 5, and the process proceeds to steps 134 and 135, respectively. In the case where the electrical device main body 201A is a third circular saw (circular saw C) to which a plurality of battery packs are capable of being mounted at the same time, the process proceed to step 141.

In step 141, the control part 50 of the battery pack 1 connected to the electrical device main body 201 refers to the information of the battery pack mounting part among the main body information acquired in step 132. In the case where the battery pack 1 is connected to one battery pack mounting part (No. 1) among the plurality (e.g., two) of battery pack mounting parts, the threshold for posture determination of the electrical device main body 201A is set to a predetermined value C based on the information including the mounting direction of the No. 1 battery pack mounting part (step 142). In the case of connecting to the other battery pack mounting part (No. 2), the threshold for posture determination of the electrical device main body 201A is set to a predetermined value D based on the information including the mounting direction of the No. 2 battery pack mounting part (step 143). Then, the control part 50 of the battery pack 1 determines the posture of the electrical device main body 201A based on the predetermined value C or D and outputs a control signal to the electrical device main body (steps 136 to 139). The control part 50 of all the battery packs 1 connected to the electrical device main body 201A performs these processes. Further, in the case where a plurality of battery packs 1 are connected, the posture of the electrical device main body 201A may be determined based on the information of any of the battery packs 1, and any of the battery packs 1 may output a control signal to the electrical device main body 201A. Further, in step 126 in FIG. 4, in the case where the operating conditions received from the plurality of battery packs 1 do not match, for example, in the case where any of the battery packs 1 is outside the operation permission range, the control part 250 of the electrical device main body 201A may prohibit (stop) driving.

In the case of the electrical device main body 201A to which a plurality of battery packs 1 are capable of being connected at the same time, it is considered that driving is possible if only one battery pack 1 is connected (in the case of a configuration of connecting the plurality of battery packs 1 in parallel), or that driving is not possible unless all the plurality of battery packs 1 are connected (in the case of a configuration of connecting the plurality of battery packs 1 in series). The control part 250 of the electrical device main body 201A is configured to determine whether the required number of battery packs 1 are connected based on the information from the battery packs 1 received via the battery communication circuits 260a and 260b. In the case of a configuration in which a plurality of battery packs 1 are capable of being connected at the same time, wireless communication may be performed between the battery packs 1, and operating conditions and various information may be transmitted and received between one battery pack 1 and the electrical device main body 201A or between each battery pack 1 and the electrical device main body 201A. Further, in the case where the sensor data of any of the battery packs 1 is abnormal, communication may be performed between the battery packs 1, and the control part 50 of a normal battery pack 1 may transmit a signal indicating abnormality to the electrical device main body 201A, or the control part 50 of the battery pack 1 having abnormal data may transmit a signal indicating abnormality to the electrical device main body 201A. Alternatively, the control part on the electrical device main body 201A side may determine data abnormality and prohibit (stop) driving of the electrical device main body 201A.

The contents of the present invention have been described above based on various embodiments, but the present invention is not limited to the above embodiments, and various changes may be made within the scope without departing from the spirit thereof. In particular, in a portable or non-portable electrical device using a detachable battery pack, various sensors may be provided on the battery pack side, the sensor outputs may be processed by the control part (microcomputer) on the battery pack side, the processed information may be transmitted to the control part on the side of the mounted electrical device main body via wired or wireless communication, and the operation of the electrical device main body may be controlled accordingly. Further, the types of sensors are not limited to the examples described above. Furthermore, the controls corresponding to the physical information may include stop or deceleration of the motor, change of output, and notification with a buzzer, LEDs, etc.

The invention claimed is:

1. An electrical device comprising an electrical device main body and a battery pack capable of being mounted to the electrical device main body,
the electrical device main body comprises:
a battery pack mounting part to which the battery pack is capable of being mounted, and
a load part driven by the battery pack,
the battery pack comprises:
a sensor part configured to collect and output physical information that arises due to external factors of the battery pack, and
a battery pack-side control part that is connected to the sensor part and to which device information outputted from a device-side control part is inputted, the battery pack-side control part is configured to control the electrical device main body according to the device information and the physical information, wherein
the electrical device main body is configured to output, to the battery pack, identification information that identifies a mounting direction of the battery pack with respect to the battery pack mounting part, and
the battery pack is configured to control the electrical device main body based on the identification information and information outputted from the sensor part.

2. The electrical device according to claim 1, wherein the battery pack is configured to output a signal that prohibits driving of the electrical device main body in a case where the information outputted from the sensor part does not match the identification information.

3. The electrical device according to claim 2, wherein the identification information comprises an operation permission range based on the mounting direction of the battery pack, and
the battery pack is configured to output a signal that prohibits driving of the electrical device main body in a case where the information outputted from the sensor part falls outside the operation permission range.

4. A battery pack capable of being mounted to an electrical device main body having a device-side control part, the battery pack comprising:
a sensor part configured to collect and output physical information that arises due to external factors of the battery pack; and
a battery pack-side control part that is connected to the sensor part and to which identification information outputted from the device-side control part and identifying a mounting direction of the battery pack is inputted, wherein the battery pack-side control part is configured to control the electrical device main body based on the identification information and the physical information.

5. The battery pack according to claim 4, configured to output a signal that prohibits driving of the electrical device main body in a case where information outputted from the sensor part does not match the identification information.

6. The battery pack according to claim 5, wherein the identification information comprises an operation permission range based on the mounting direction of the battery pack, and
the battery pack is configured to output a signal that prohibits driving of the electrical device main body in a case where the information outputted from the sensor part falls outside the operation permission range.

7. An electrical device comprising an electrical device main body to which the battery pack according to claim 4 is capable of being mounted,
wherein the electrical device main body comprises:
a battery pack mounting part to which the battery pack is capable of being mounted, and
a load part driven by the battery pack.

8. An electrical device comprising the battery pack according to claim 4 and an electrical device main body to which the battery pack is capable of being mounted,
wherein the electrical device main body comprises:
a battery pack mounting part to which the battery pack is capable of being mounted, and
a load part driven by the battery pack.

9. An electrical device comprising:
an electrical device main body having a load part;
a battery pack capable of being mounted to the electrical device main body;
a sensor part configured to collect and output physical information that arises due to external factors of the battery pack; and
a control part that is connected to the sensor part and is configured to be capable of changing an operating condition of the electrical device main body based on a mounting direction of the battery pack, wherein
the electrical device main body is one of a first electrical device main body to which the mounting direction is a first direction and a second electrical device main body to which the mounting direction is a second direction different from the first direction,
the control part is configured to be capable of changing an operating condition of the electrical device main body based on whether the electrical device main body is the first electrical device main body or the second electrical device main body.

10. The electrical device according to claim 9, wherein, the control part is configured to be capable of changing a control of the electrical device main body based on the physical information.

11. The electrical device according to claim 10, wherein, the control part is configured to permit driving the load part when the physical information is a first information in state that the battery pack and the first electrical device main body are connected, and
the control part is configured to prohibit driving the load part when the physical information is the first information in state that the battery pack and the second electrical device main body are connected.

12. The electrical device according to claim 9, wherein, the sensor part and the control part are disposed in the battery pack.

\* \* \* \* \*